United States Patent
Bytheway

(10) Patent No.: US 12,420,989 B2
(45) Date of Patent: Sep. 23, 2025

(54) ANTI-CROSS-THREADING THREAD CONFIGURATION

(71) Applicant: Runway Blue, LLC, Lehi, UT (US)

(72) Inventor: David Bytheway, Springville, UT (US)

(73) Assignee: Runway Blue, LLC, Lehi, UT (US)

( * ) Notice: Subject to any disclaimer, the term of this patent is extended or adjusted under 35 U.S.C. 154(b) by 1052 days.

(21) Appl. No.: 16/997,592

(22) Filed: Aug. 19, 2020

(65) Prior Publication Data

US 2021/0061523 A1 Mar. 4, 2021

Related U.S. Application Data

(60) Provisional application No. 62/892,196, filed on Aug. 27, 2019.

(51) Int. Cl.
*B65D 41/04* (2006.01)

(52) U.S. Cl.
CPC .............................. *B65D 41/0471* (2013.01)

(58) Field of Classification Search
CPC .... B65D 41/047; B65D 39/08; B65D 41/042; B65D 41/04; B65D 1/0246; B65D 41/041; B65D 41/0471
USPC ................................................. 215/329, 331
See application file for complete search history.

(56) References Cited

U.S. PATENT DOCUMENTS

| | | | |
|---|---|---|---|
| 1,676,023 A * | 7/1928 | Hammer | B65D 41/04 215/331 |
| 1,937,492 A | 11/1933 | Merolle | |
| 1,988,383 A * | 1/1935 | Hermani | B65D 41/0471 220/301 |
| 2,952,374 A | 9/1960 | Pryale | |
| 3,127,049 A * | 3/1964 | Welty et al. | F16J 13/12 220/301 |
| 3,224,799 A | 12/1965 | Blose et al. | |
| 3,741,421 A * | 6/1973 | Wittwer | B65D 41/0471 215/217 |
| 4,093,096 A * | 6/1978 | Augros | B65D 41/62 215/334 |
| 4,140,235 A * | 2/1979 | Rausing | B65D 39/08 215/305 |
| 4,373,641 A * | 2/1983 | Banich, Sr. | B65D 41/0471 215/331 |
| 4,387,822 A * | 6/1983 | Lynn | B65D 41/0471 215/330 |
| 4,591,063 A * | 5/1986 | Geiger | B65D 41/045 215/331 |
| 4,632,240 A | 12/1986 | Goncalves | |

(Continued)

FOREIGN PATENT DOCUMENTS

| | | |
|---|---|---|
| EP | 0108980 B1 | 1/1987 |
| WO | 2011070326 A1 | 6/2011 |

OTHER PUBLICATIONS

International Search Report and Written Opinion for International Application No. PCT/US2020/047020, European Patent Office, mailed Jan. 15, 2021, 21 pages.

*Primary Examiner* — Ernesto A Grano
(74) *Attorney, Agent, or Firm* — Sterne, Kessler, Goldstein & Fox P.L.L.C.

(57) ABSTRACT

A threaded closure system includes a threaded opening and a threaded closure, where at least one thread of the threaded opening or the threaded closure has a leading portion with a steeper angle than the rest of the thread.

20 Claims, 14 Drawing Sheets

(56) References Cited

U.S. PATENT DOCUMENTS

| | | | | |
|---|---|---|---|---|
| 4,640,430 | A | * | 2/1987 | Haines ............... B65D 41/04 215/330 |
| 5,398,830 | A | * | 3/1995 | de Pous ............ B65D 41/0471 215/47 |
| 5,449,077 | A | * | 9/1995 | Seidler ............... B65D 50/045 215/221 |
| 5,494,174 | A | | 2/1996 | Rohr et al. |
| 5,687,863 | A | * | 11/1997 | Kusz ................. B65D 50/046 215/331 |
| 5,836,465 | A | | 11/1998 | King |
| 5,887,739 | A | * | 3/1999 | Prevot ................. B65D 1/023 215/382 |
| 5,975,322 | A | * | 11/1999 | Reid ................... B65D 41/62 215/217 |
| D423,936 | S | * | 5/2000 | Smith ......................... D9/557 |
| D428,815 | S | * | 8/2000 | Mooney ...................... D9/557 |
| D442,866 | S | * | 5/2001 | Mooney ...................... D9/520 |
| 6,227,391 | B1 | * | 5/2001 | King ................. B65D 41/0471 215/307 |
| 6,286,733 | B1 | | 9/2001 | Francois |
| D467,813 | S | * | 12/2002 | Silvers ........................ D9/559 |
| 6,568,156 | B2 | * | 5/2003 | Silvers ................. B65B 3/022 53/140 |
| 6,981,602 | B2 | * | 1/2006 | Ma .......................... B29C 43/50 215/256 |
| 7,182,213 | B2 | * | 2/2007 | King ................. B65D 41/3428 220/296 |
| 7,246,713 | B2 | | 7/2007 | King |
| D612,250 | S | * | 3/2010 | Shah ............................ D9/557 |
| 7,802,692 | B2 | * | 9/2010 | Maejima ............... B65D 41/04 285/291.1 |
| 7,942,287 | B2 | | 5/2011 | King |
| 8,146,769 | B2 | | 4/2012 | Hogan |
| 8,292,102 | B2 | * | 10/2012 | Penny ................. B65D 1/0246 215/44 |
| 8,371,463 | B2 | * | 2/2013 | Beecroft ............. B65D 50/046 215/232 |
| 8,596,029 | B2 | * | 12/2013 | Pedmo .................. B67C 3/045 53/471 |
| 2006/0011633 | A1 | * | 1/2006 | Cook ................. B65D 51/1661 215/331 |
| 2008/0257849 | A1 | * | 10/2008 | Farrar ................. B65D 39/10 215/44 |
| 2008/0314856 | A1 | * | 12/2008 | Penny ............... B65D 41/3447 215/44 |
| 2009/0301986 | A1 | * | 12/2009 | Phelan ............... B65D 41/0421 215/349 |
| 2011/0024382 | A1 | * | 2/2011 | Moreira ............. B65D 81/2015 215/316 |
| 2012/0000879 | A1 | * | 1/2012 | McFarlane .......... B65D 1/0246 215/44 |
| 2012/0037589 | A1 | * | 2/2012 | King ................. B65D 41/0471 215/329 |
| 2013/0270211 | A1 | * | 10/2013 | Perrone ............... B65D 1/0246 215/44 |
| 2014/0263339 | A1 | * | 9/2014 | Bates ..................... B65D 85/72 220/296 |
| 2015/0329232 | A1 | * | 11/2015 | Brozell ............. B65D 41/0471 215/44 |
| 2019/0086012 | A1 | | 3/2019 | Gilbreath et al. |

* cited by examiner

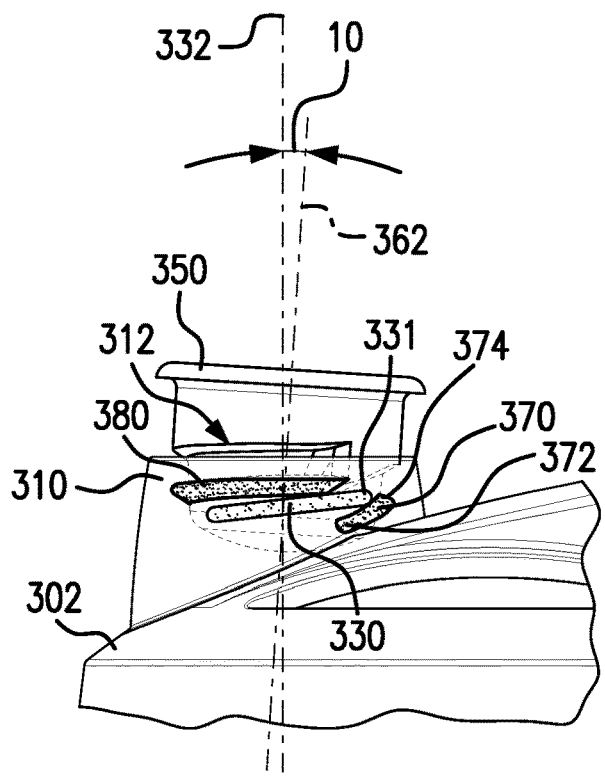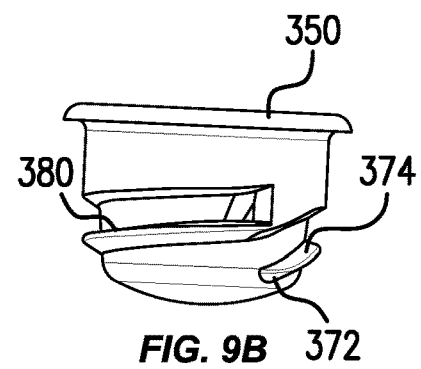
FIG. 9A
FIG. 9B
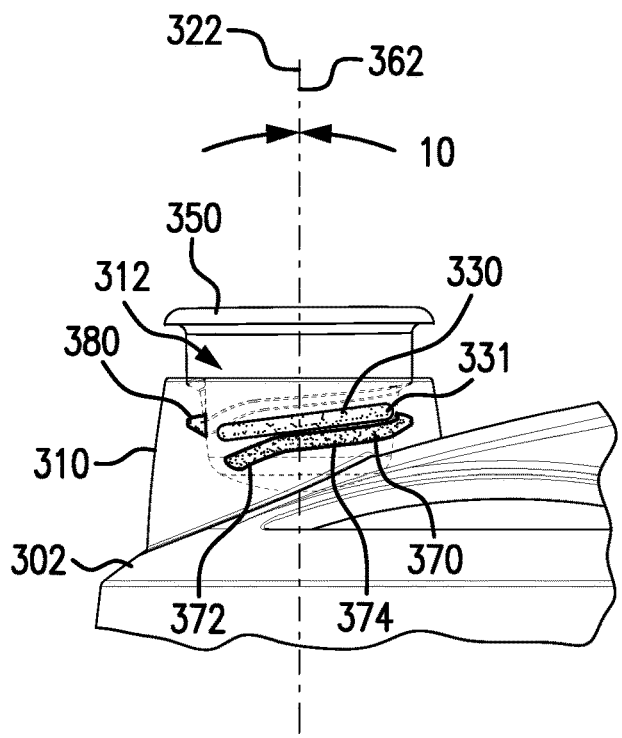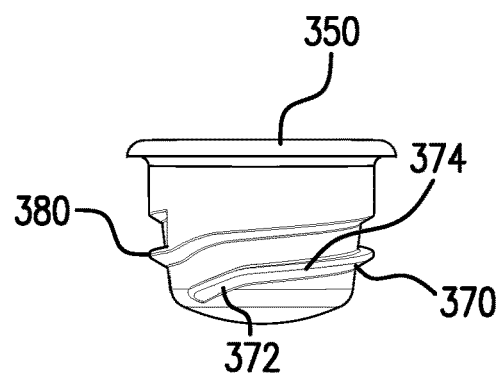
FIG. 10A
FIG. 10B

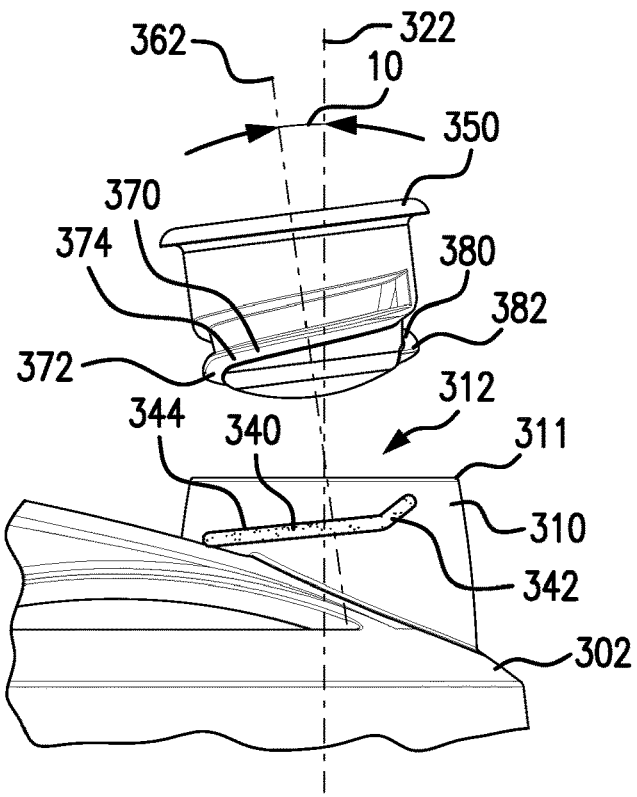
FIG. 11
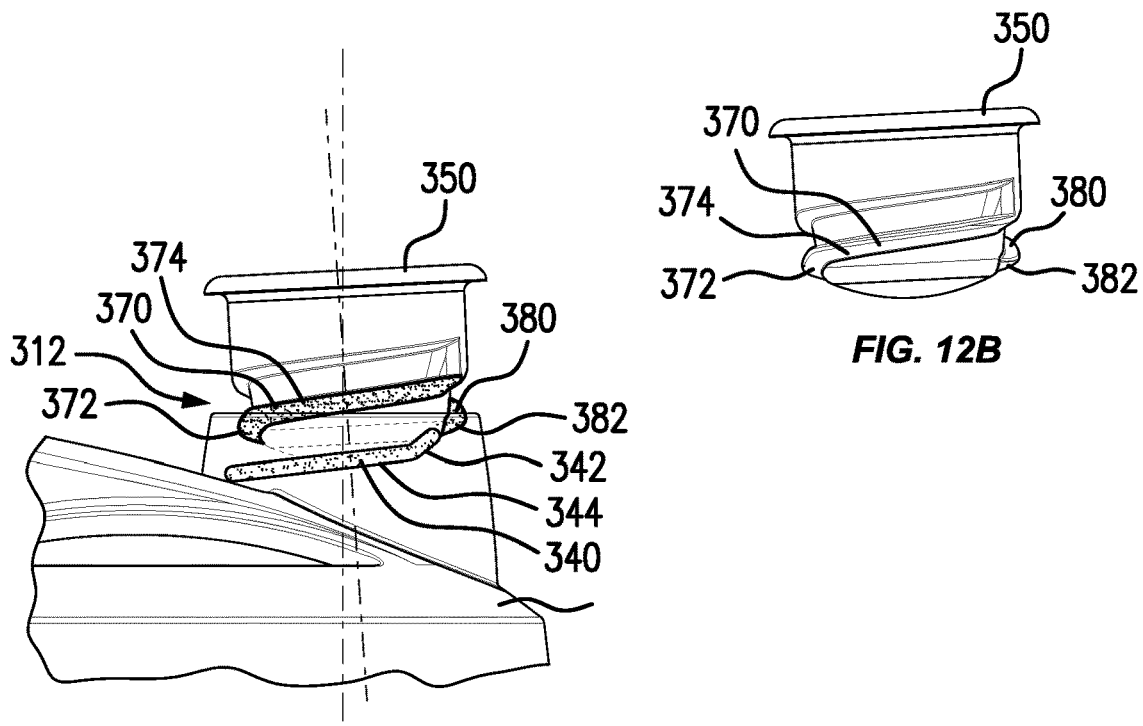
FIG. 12A
FIG. 12B

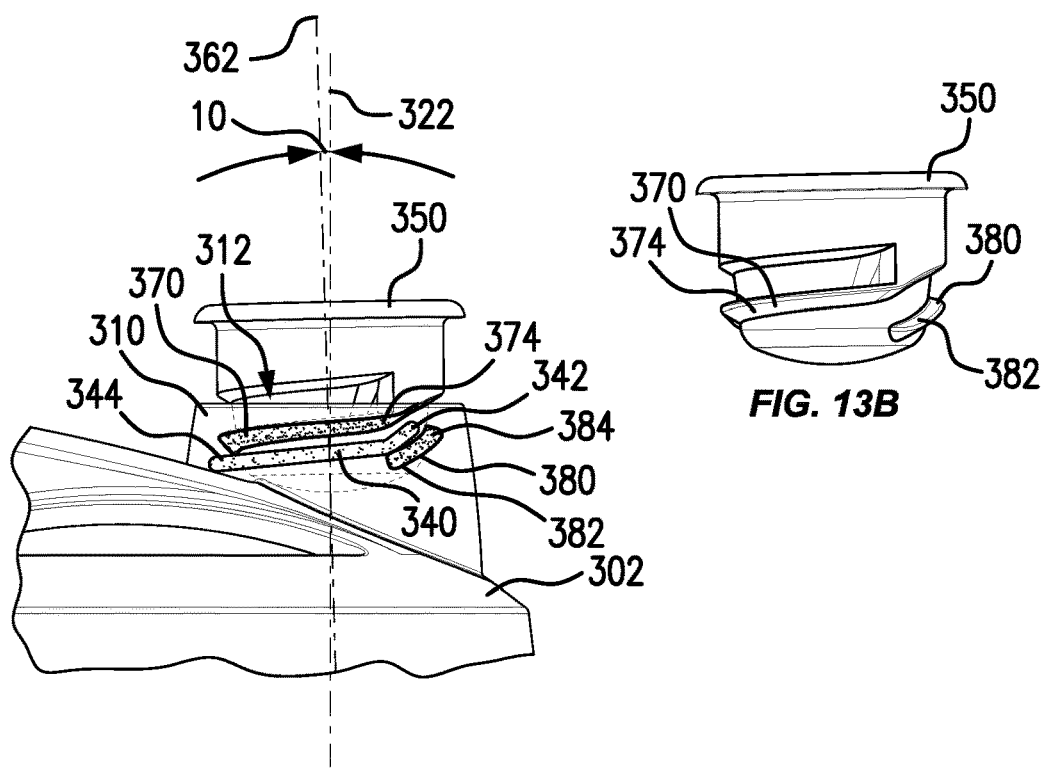
FIG. 13A
FIG. 13B
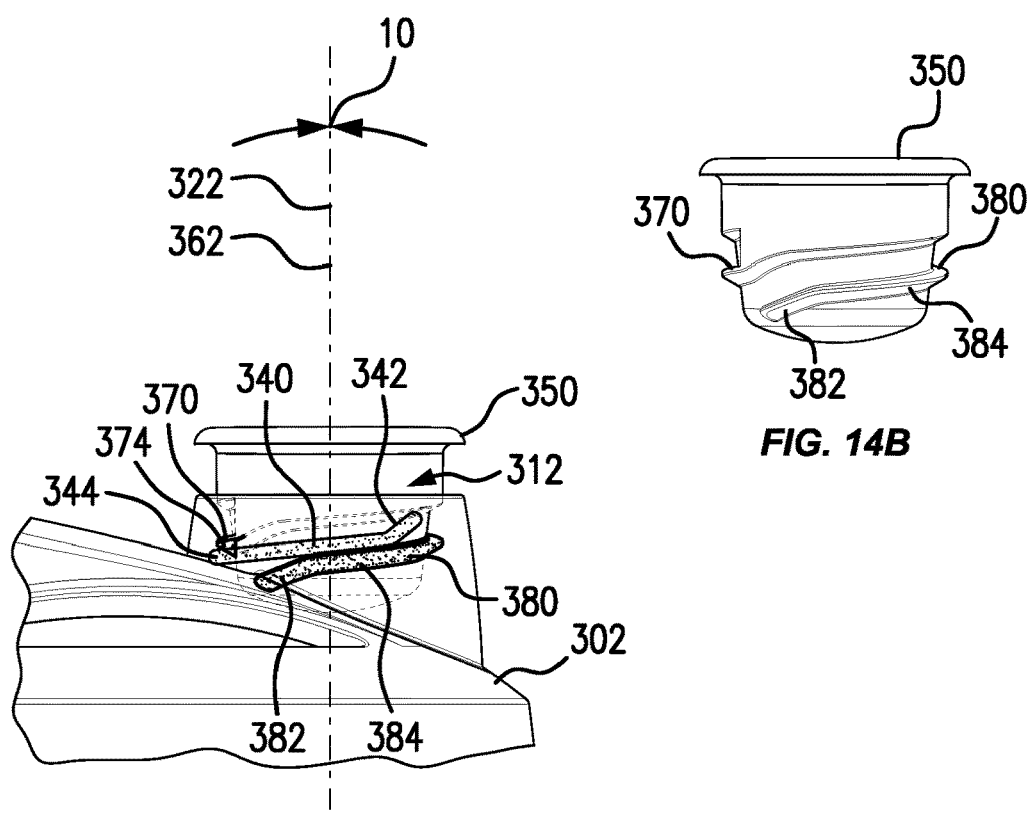
FIG. 14A
FIG. 14B

ANTI-CROSS-THREADING THREAD CONFIGURATION

CROSS-REFERENCE TO RELATED APPLICATIONS

This application claims the benefit of U.S. Provisional Patent Application No. 62/892,196, filed Aug. 27, 2019, which is incorporated herein in its entirety by reference thereto.

FIELD

This disclosure generally relates to threaded connections. More specifically, some embodiments relate to containers (e.g., drinking vessels) with threaded closures that inhibit misalignment (e.g., cross-threading) between mating threads.

BACKGROUND

Threaded connections may be used to connect two things together. For example, two components may have helical threads that mate together such that one or more threads of one component engage between threads of the other component. Such threaded connections may be useful, for example, for connecting a threaded closure to a threaded spout of a drinking vessel. Such threaded connections may also be useful, for example, for connecting threaded ends of hoses, or for various other applications where one component is coupled to another.

SUMMARY

Some embodiments described herein are directed to a container including an opening, a first helical thread disposed about at least a portion of the opening, a closure configured to close the opening, and a second helical thread, the second helical thread formed on the closure. The second helical thread may have a leading portion having a first helix angle and a trailing portion having a second helix angle, where the first helix angle is lesser than the second helix angle.

Some embodiments described herein are directed to a threaded closure system, including a threaded opening and a threaded closure, where at least one thread of the threaded opening or of the threaded closure has a leading portion with a lesser helix angle than the rest of the thread.

Some embodiments described herein are directed to a beverage container lid, including a lid base, a drinking spout formed in the lid base, an arm pivotably connected to the lid base at a pivot axis, and a drinking spout closure connected to the arm. The drinking spout may include two helical threads. In some embodiments, the two helical threads of the drinking spout do not overlap vertically, while in other embodiments they may. The two helical threads of the drinking spout, from a top view, may be symmetrically positioned across an imaginary line extending perpendicularly toward the pivot axis. There may be a greater horizontal distance between the two helical threads of the drinking spout at a far side of the drinking spout relative to the pivot axis than at a near side of the spout relative to the pivot axis. The drinking spout closure may include two helical threads. At least one of the two helical threads of the drinking spout closure may have a leading portion with a decreased helix angle relative to a trailing portion of the at least one of the two helical threads of the drinking spout closure.

BRIEF DESCRIPTION OF THE FIGURES

The accompanying drawings, which are incorporated herein and form a part of the specification, illustrate the present disclosure and, together with the description, further serve to explain the principles thereof and to enable a person skilled in the pertinent art to make and use the same.

FIG. 9A shows a right-side view of a portion of the lid base of the container of FIG. 1, with a portion of the closure of the container of FIG. 1 disposed in a third position relative to the lid base during a closing operation.

FIG. 9B shows the closure of FIG. 9A without schematic overlays.

FIG. 10A shows a right-side view of a portion of the lid base of the container of FIG. 1, with a portion of the closure of the container of FIG. 1 disposed in a fourth position relative to the lid base during a closing operation.

FIG. 10B shows the closure of FIG. 10A without schematic overlays.

FIG. 11 shows a left-side view of a portion of the lid base of the container of FIG. 1, with a portion of the closure of the container of FIG. 1 disposed in a first position relative to the lid base during a closing operation.

FIG. 12A shows a left-side view of a portion of the lid base of the container of FIG. 1, with a portion of the closure of the container of FIG. 1 disposed in a second position relative to the lid base during a closing operation.

FIG. 12B shows the closure of FIG. 12A without schematic overlays.

FIG. 13A shows a left-side view of a portion of the lid base of the container of FIG. 1, with a portion of the closure of the container of FIG. 1 disposed in a third position relative to the lid base during a closing operation.

FIG. 13B shows the closure of FIG. 13A without schematic overlays.

FIG. 14A shows a left-side view of a portion of the lid base of the container of FIG. 1, with a portion of the closure of the container of FIG. 1 disposed in a fourth position relative to the lid base during a closing operation.

FIG. 14B shows the closure of FIG. 14A without schematic overlays.

DETAILED DESCRIPTION

Figure 1:
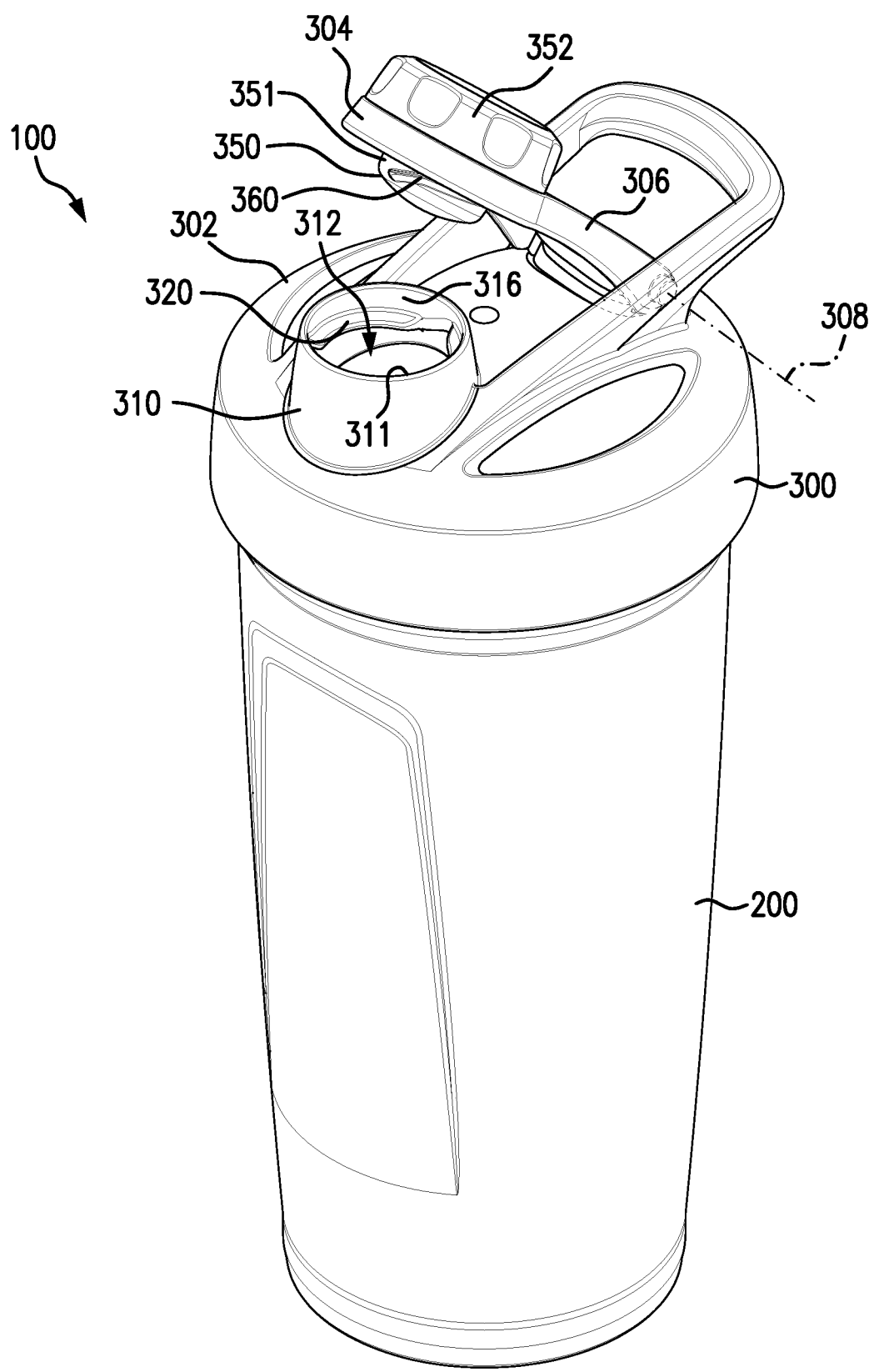
FIG. 1 shows a beverage container.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein comport with standards used by those experienced or skilled in the art to most effectively convey the substance of their work to others skilled in the art. In some instances, well-known methods, procedures, and components have not been described in detail to avoid unnecessarily obscuring aspects of the disclosure.

References in the specification to "some embodiments" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to apply such feature, structure, or characteristic in connection with other embodiments whether or not explicitly described.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Threaded connections are useful to join two components together. Each component may have one or more threads, which engage with one or more threads of the other component. Threads may be formed on the interior or exterior surfaces of components to be joined together. Typically, one component has threads on an interior surface (sometimes known as a "female" component) and a mating component has threads on an exterior surface (sometimes known as a "male" component). The male component threads within the female component to join the two components together. In order to engage tightly, mating threads may be formed such that their thread surfaces consistently contact each other. For example, threads may be formed helically, and mating threads may have the same helix angle. In this way, such mating threads ideally slide along one another smoothly and consistently when their axes are coincident, remaining in contact throughout their engaged portions.

Some threaded connections use multiple threads per component (e.g., two threads on the male component and two threads on the female component). Ideally, all threads engage simultaneously and thread together smoothly. But such engagement can depend on having a good alignment between thread axes of the male and female components. (A thread axis is an imaginary line extending centrally with respect to the thread's helix.) If their axes are not aligned, one set of threads may engage, while another set may not. This is sometimes known as "cross-threading." Cross-threading can interfere with full thread engagement, can interfere with any sealing function of the mating threads, and can damage threads of both components, among other negative consequences.

In some embodiments disclosed herein, mating threads are configured to avoid cross-threading. In some embodiments, the starting points of two threads of one of a pair of mating components are offset (i.e., their starting points are not equally distributed around the thread axis of the component), while the starting points of the other one of the pair of mating components are less offset (e.g., equally distributed) around the thread axis of the component. This creates a distinct order in which the mating threads engage each other, giving additional time after the first-engaging threads begin engagement for the second-engaging threads to be moved into their proper position for smooth engagement.

Alternatively or additionally, in some embodiments discussed herein, threads of a first one of a pair of mating components may have a leading portion that has a lesser helix angle than the helix angle of its trailing portion. Because it has a lesser helix angle, the leading portion is steeper, and can more easily catch onto the leading portion of threads of the second one of the pair of mating components, and can quickly draw the mating components together before the trailing portions become engaged. In some embodiments, one or more threads of the second one of the pair of mating components also has a leading portion that has a lesser helix angle than the helix angle of its trailing portion, which can improve the ability of the mating components to be brought into alignment and avoid cross-threading.

In some embodiments, at least one thread of one or both of a pair of mating components may have a leading portion that has a lesser helix angle than the helix angle of its trailing portion, as described above, and the starting points of two threads of one of the pair of mating components may be offset (i.e., their starting points are not equally distributed around the thread axis of the component) while the starting points of the threads of the other one of the pair of mating components are less offset (e.g., equally distributed) around the axis of the component (as also described above). Such combination of features can further improve the ability of the mating components to be brought into alignment and avoid cross-threading.

These and other embodiments are discussed below in more detail with reference to the figures.

FIG. 1 shows a beverage container 100. Beverage container 100 includes a vessel 200 and a lid 300. Lid 300 may be removably connected to vessel 200 (e.g., via threads or a snap fit). Lid 300 includes a lid base 302. Lid base 302 includes a drinking spout 310 forming an opening 312. Lid 300 also includes a closure assembly 304 coupled to lid base 302. Closure assembly 304 includes a closure 350 (e.g., a cap) for closing drinking spout 310. Closure assembly 304 may include a closure arm 306 that couples closure 350 to lid base 302 (e.g., pivotably, via a pivot axis 308). In some embodiments, closure 350 may include a grip portion 352, which may be rotatable by a user to rotate closure 350 in a closing or opening operation relative to drinking spout 310. Closure 350 may freely rotate relative to closure arm 306 (e.g., about a thread axis 362, described elsewhere herein).

As shown in FIG. 1, drinking spout 310 includes threads 320, and closure 350 includes threads 360. In an opening operation, a user may remove closure 350 from drinking spout 310 by rotating closure relative to drinking spout 310 in a disengagement direction (e.g., counterclockwise) to "unscrew" threads 320 and threads 360 from each other. The user may then drink from drinking spout 310. The user may close drinking spout 310 in a closing operation (thereby sealing contents within beverage container 100) by rotating closure 350 relative to drinking spout 310 in an engagement direction (e.g., clockwise) to "screw" threads 320 and threads 360 together.

As shown, threads 320 are internal threads (e.g., disposed on an interior side of a wall 316 forming opening 312) and threads 360 are external threads (e.g., disposed on an exterior side of to a wall 351 for extending within opening 312). However, it should be understood that in any of the embodiments discussed herein, threads shown and described as internal threads may instead be external threads, and threads shown and described as external threads may instead be internal threads. In any case, threads 320 may surround at least a portion of opening 312, and threads 360 may surround at least a portion of closure 350.

Threads 320 and threads 360 can engage such that closure 350 closes opening 312 (e.g., sealing opening 312 to prevent the passage therethrough of liquid). To effect such engagement, threads 320 and threads 360 may be helical. For example, closure 350 may be positioned over opening 312 (e.g., rotated into position over opening 312 by closure arm 306) and lowered until at least a portion of threads 360 contact or overlap horizontally with at least a portion of threads 320. Closure 350 may then be rotated such that threads 360 turn and slide below threads 320. Closure 350 may be rotated in an engagement direction in which threads tend toward increased engagement (commonly a clockwise direction). In such an example, an upper surface of threads 360 may be in contact with a lower surface of threads 320. Due to the helical slope of the engaging threads 360 and 320, closure 350 will be drawn deeper within opening 312 as closure 350 rotates further relative to opening 312. Upon full engagement, closure 350 may be stopped from further rotation, and opening 312 may be sealed by closure 350. For example, an upper edge 311 of drinking spout 310 may be drawn into contact with an interior surface of closure 350, or with a gasket of closure assembly 304 disposed between drinking spout 310 and closure 350, thereby creating a seal between closure 350 and spout 310, sealing opening 312.

In some embodiments, any or all of threads 320 and threads 360 may be continuous (i.e., each individual thread may not include a break or discontinuity along its length) and may have a smooth engaging surface throughout its length (i.e., an engaging surface free from edges or sharp transitions).

Figure 2A:
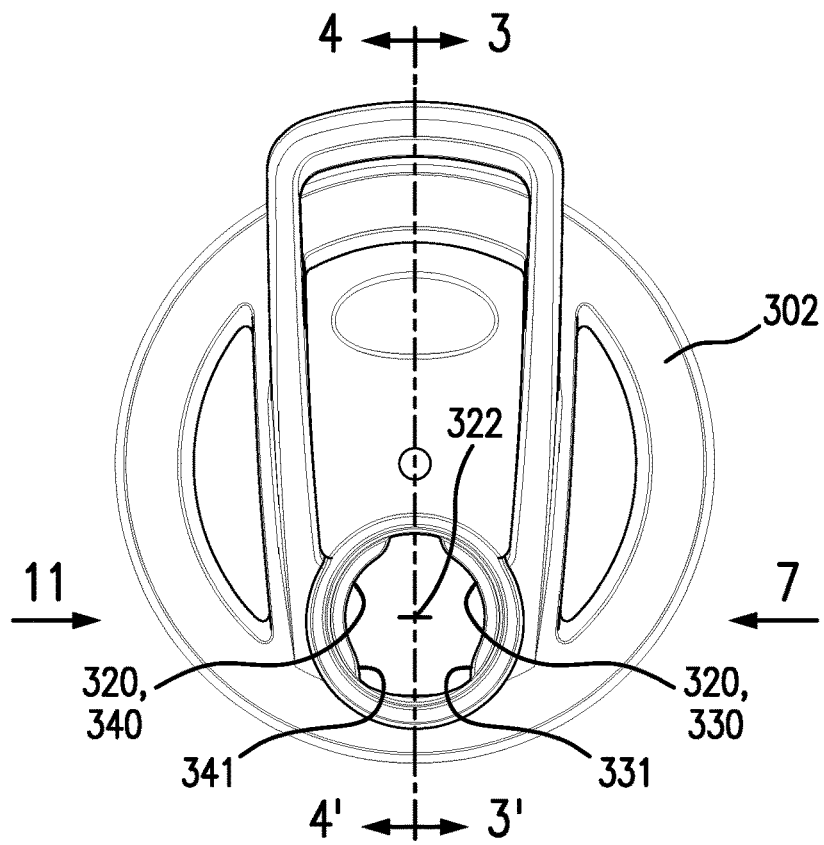
FIG. 2A shows a lid of the beverage container of FIG. 1 with its closure assembly removed.
Figure 2B:
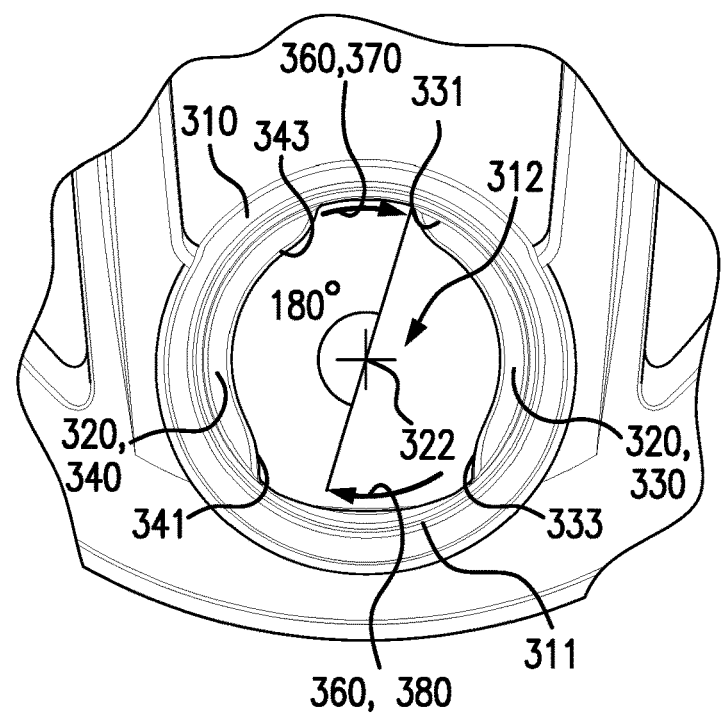
FIG. 2B shows an enlarged view of a portion of FIG. 2A.

In some embodiments, closure 350 may have multiple threads 360 (e.g., two threads 360). And in some embodiments, opening 312 may have multiple threads 320 (e.g., two threads 320). As mentioned above, multiple-thread arrangements can be susceptible to undesirable cross-threading. To help inhibit such cross threading, threads 320 may comprise a first thread 330 and a second thread 340, as shown in FIGS. 2A and 2B. FIG. 2A is a top view of lid base 302. FIG. 2B is an enlarged view of opening 312. Closure assembly 304 is not shown in FIG. 2A or 2B. As shown, first thread 330 and second thread 340 may be offset about a central axis 322 of threads 320. That is to say, a leading end 331 of first thread 330 may not be spaced 180 degrees about central axis 322 from a leading end 341 of second thread 340. For example, leading end 331 of first thread 330 may be spaced between 190 and 230 degrees (e.g., between 200 and 220 degrees, for example 110 degrees) about central axis 322 from leading end 341 of second thread 340. As shown in FIG. 2B, a leading end 331 of first thread 330 may be spaced closer to a trailing end 343 of second thread 340 than a leading end 341 of second thread 340 is spaced from a trailing end 333 of first thread 330. In this configuration, two mating threads (e.g., threads 360 of closure 350) that have their leading ends spaced across from each other (e.g., 180 degrees apart) will engage threads 320 (i.e., first thread 330 and second thread 340) sequentially, not simultaneously. This leaves additional time and rotation after the first pair of threads are engaged for the second pair to come into proper alignment and engagement, which helps inhibit cross-threading.

In the example shown, first thread 330 and second thread 340 are, from a top view, symmetrically positioned across an imaginary symmetry line extending perpendicularly toward pivot axis 308 (i.e., line 3-3' and 4-4'); yet some embodiments do not possess this symmetry. Also, in the example shown there is a greater horizontal distance between the two helical threads 320 at a far side of the drinking spout 310/opening 312 from pivot axis 308 than at a near side of drinking spout 310/opening 312; yet some embodiments are not spaced in this way. Horizontal separation between the two helical threads 320 at a far side of the drinking spout 310/opening 312 from pivot axis 308 may facilitate drinking through drinking spout 310/opening 312 by allowing space for water or other liquid to flow between the two threads 320, so that less or potentially none of the liquid flows over threads 320 when passing through drinking spout 310/opening 312. Additionally in the illustrated example, leading end 331 is spaced closer to the imaginary symmetry line than is leading end 341, yet other embodiments may be spaced in other ways. In the illustrated example, leading end 341 of second thread 340, which is disposed farther from pivot axis 308 of closure arm 306 than is central axis 322 of threads 320, is positioned more than 180 degrees in the direction of closing thread travel past leading end 331 of first thread 330, which is disposed closer to pivot axis 308 than is central axis 322 of threads 320. Because in the case of a closure on a pivot arm the side of the closure closest to the axis of the pivot arm (e.g., pivot axis 308) will often tend toward engaging in the opening first, having such a spacing between the leading end that is closer to the pivot axis (e.g., leading end 331) and the leading end that is farther from the pivot axis (e.g., leading end 341) helps to ensure that a thread of the closure (e.g., a thread 360 of closure 350) will first engage with the thread of the opening having the leading end that is closer to the pivot axis (e.g., thread 330), on the side of the opening closer to the pivot axis.

FIG. 2B shows a representation of the relative positioning of threads 360 (also referred to as movable threads) of closure 350 at the beginning of an engagement with threads 320 (also referred to as stationary threads) of opening 312. Threads 360 may comprise a first thread 370 and a second thread 380. Leading ends of threads 360 are represented by arrows in FIG. 2B. As shown, when the leading end of first thread 370 of closure 350 is beginning engagement with leading end 331 of first thread 330 of opening 312, leading end of second thread 380 of closure 350 is still spaced a distance away from leading end 341 of second thread 340 of opening 312. As shown, in such configuration first thread 330 does not overlap vertically with second thread 340.

Figure 3:
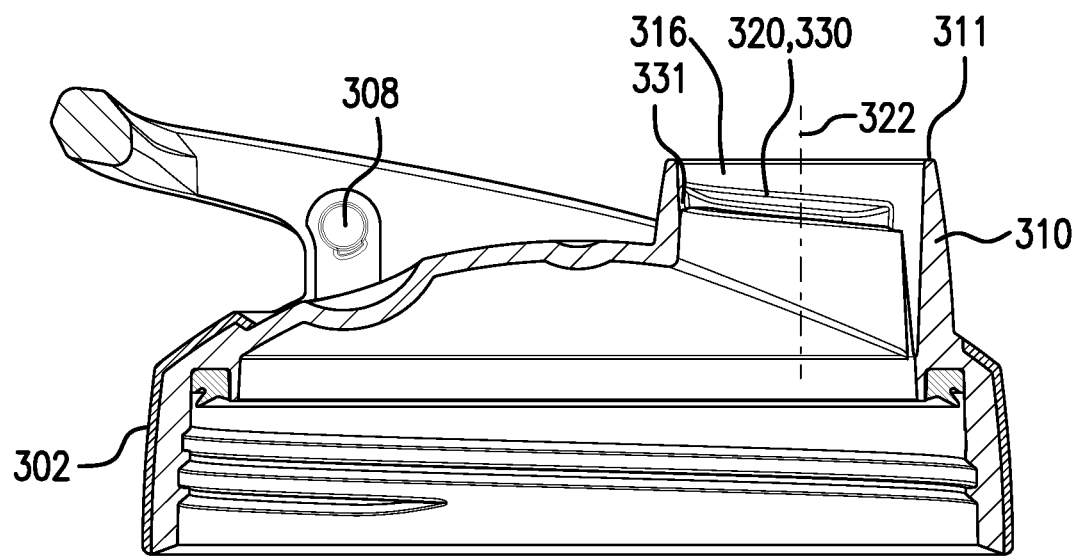
FIG. 3 shows a cross-sectional view taken along line 3-3' of FIG. 2A.
Figure 4:
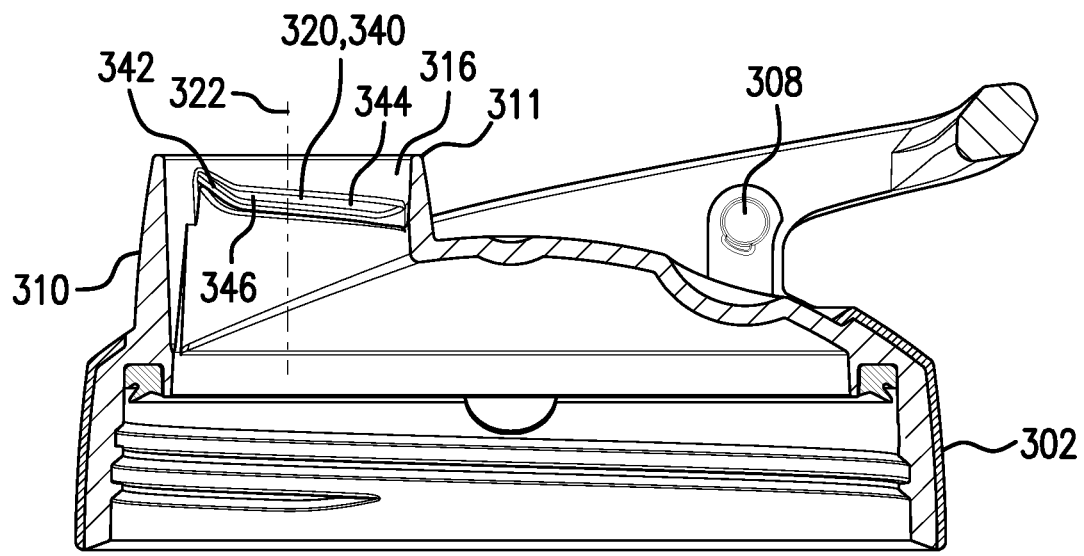
FIG. 4 shows a cross-sectional view taken along line 4-4' of FIG. 2A.

FIGS. 3 and 4 show opposing cross-sectional views of lid base 302. FIG. 3 is taken along line 3-3' of FIG. 2A, and FIG. 4 is taken along line 4-4' of FIG. 2A. FIGS. 3 and 4 together further show the offset nature of threads 320. As shown, threads 320 are positioned further toward a rear side of lid base 302 (to the left in FIG. 3 and to the right in FIG. 4) than to a front side of lid base 302 (to the right in FIG. 3 and to the left in FIG. 4). Such relative positioning means that the initial thread engagement will occur toward the rear of opening 312 (where first thread 330 and second thread 340 are closer together). This can be desirable to help with alignment of a mating component (e.g., closure 350), especially when such mating component's motion is constrained by a hinged arm (e.g., closure arm 306) that has a pivot axis to the same side of opening 312 as the side where first thread 330 and second thread 340 are closer together (e.g., the rear side in FIG. 1), as explained in more detail elsewhere herein.

Figure 5:
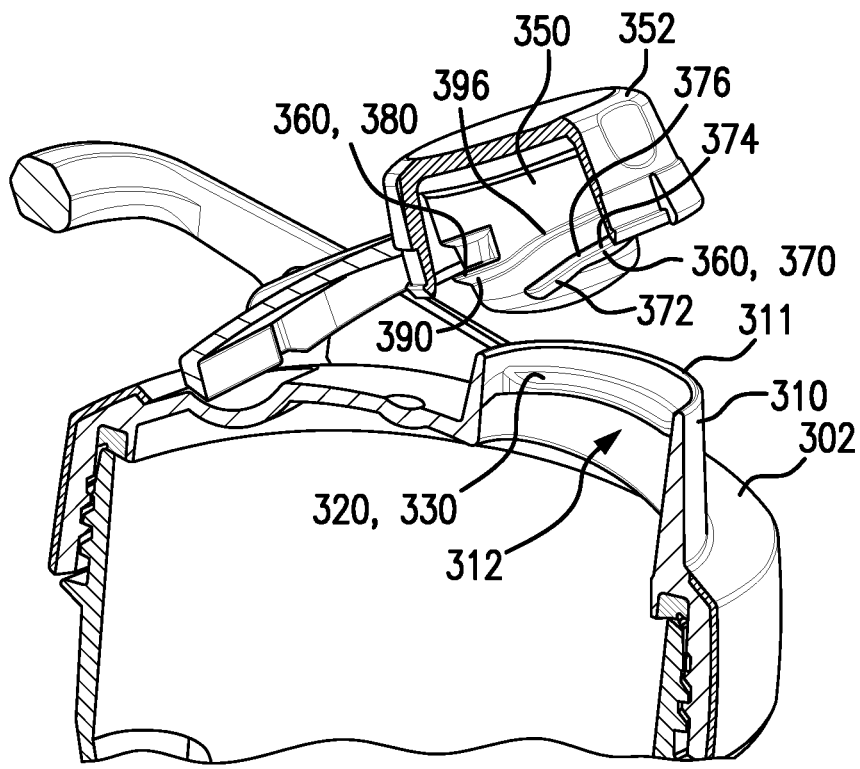
FIG. 5 shows a sectional perspective view of a portion of the container of FIG. 1.
Figure 6:
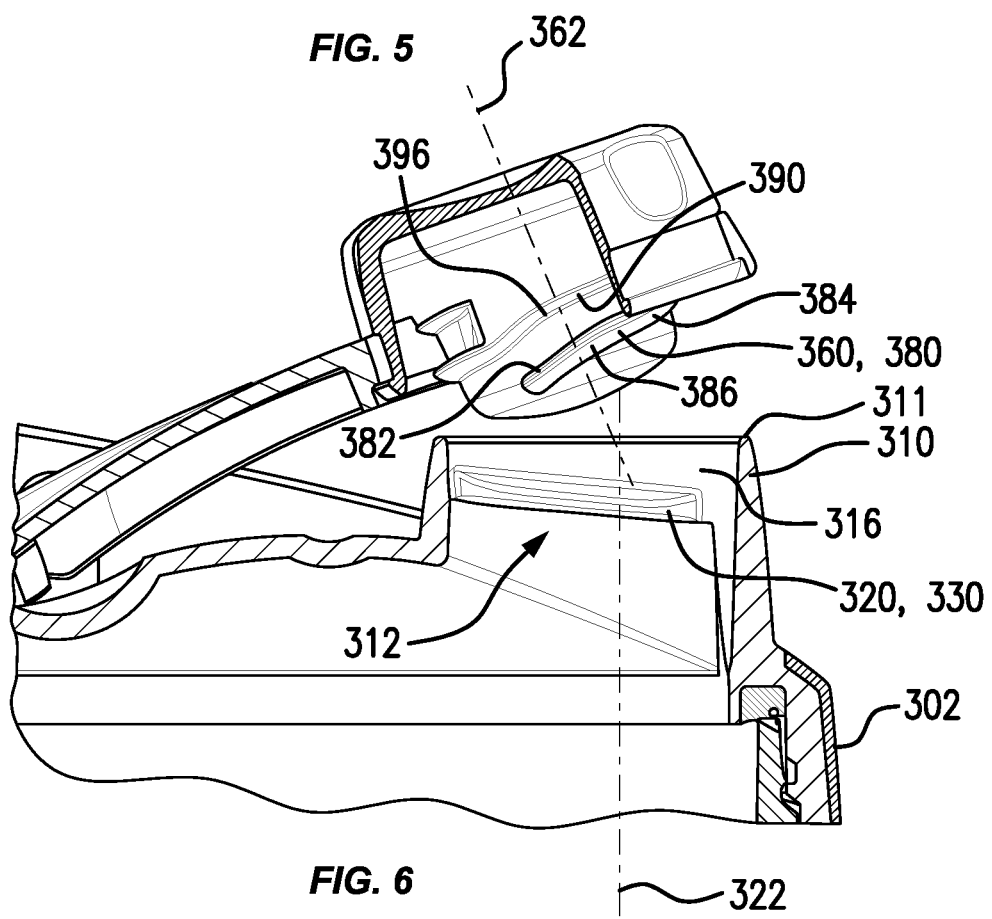
FIG. 6 shows a sectional side view of a portion of the container of FIG. 1.

FIGS. 5 and 6 show partial sectional views of drinking container 100. First thread 370 and second thread 380 of closure 350 are shown. In some embodiments, first thread 370 has a leading portion 372 and a trailing portion 374, joined at a transition 376 (e.g., forming a bend in thread 370). Leading portion 372 and trailing portion 374 may be directly connected (e.g., at transition 376). As shown, leading portion 372 has a lesser helix angle than trailing portion 374, and transition 376 transitions between the two helix angles of leading portion 372 and trailing portion 374. As shown, leading portion 372 has a constant helix angle and trailing portion 374 has a constant helix angle. A helix angle is the angle made by the helix of a thread and its relation to its thread axis, and is the geometric complement to a thread's lead angle. A lead angle is the angle made by the helix of a thread with a plane perpendicular to its thread axis. In this document, helix angle will be referenced from its acute side relative to a thread's axis, thus a thread having a steeper slope (or "pitch") relative to a vertical thread axis has a lesser helix angle. In the case of threads with a tapering end, the tapered end is not considered to constitute a change in helix angle.

Upon rotation relative to threads with which threads 360 are to be engaged (e.g., threads 320 of opening 312), leading portion 372's steeper angle allows it to engage with a leading portion of the mating thread (e.g., leading end 331 of first thread 330 of opening 312) more easily than if leading portion 372's angle were shallower (e.g., matching that of trailing portion 374).

Further, the steeper angle of leading portion 372 as it moves against the leading end of its mating thread will more quickly draw closure 350 into alignment with the mating threads (and into alignment with, for example, opening 312) such that second thread 380 of closure 350 can align and engage with its corresponding mating thread (e.g., second thread 340 of opening 312) to help inhibit cross-threading due to misalignment. In other words, upon engaged rotation of closure 350 relative to opening 312, a rate relative to rotation at which closure 350 is drawn toward opening 312 is greater while leading portions of threads 320, 360 (i.e., portions with at least one having a lesser helix angle) are engaged than while trailing portions of threads 320, 360 are engaged (i.e., portions with lesser helix angles). In some embodiments, second thread 380 of closure 350 is configured the same as first thread 370 of closure 350, except that second thread 380 is located at a different position about a central thread axis 362 of threads 360 (e.g., positioned 180 degrees about thread axis 362 relative to the position of first thread 370).

Returning to FIG. 4, second thread 340 of opening 312 in some embodiments may have a leading portion 342 and a trailing portion 344, joined at a transition 346 (e.g., forming a bend in thread 340). Leading portion 342 and trailing portion 344 may be directly connected (e.g., at transition 346). As shown, and similar to threads 360 described above, leading portion 342 has a lesser helix angle than trailing portion 344, and transition 346 transitions between the two helix angles of leading portion 342 and trailing portion 344. As shown, leading portion 342 has a constant helix angle and trailing portion 344 has a constant helix angle. Upon rotation of threads that are to be engaged with threads 320 (e.g., threads 360 of closure 350), leading portion 342's steeper angle allows it to engage with a leading portion of the mating thread (e.g., leading portion 371 or 381 of threads 370 or 380, respectively) more easily than if leading portion 342's angle were shallower (e.g., matching that of trailing portion 344). This can help inhibit cross-threading especially when another set of threads is already engaged (e.g., when thread 340 is the second thread of its component to be engaged). As explained elsewhere herein, the order of thread engagement can be controlled by offsetting threads about their axis (e.g., to ensure that second thread 340 is the second thread of its component to be engaged). For instance, threads 330 and 340 can be offset about their central axis 322 such that thread 330 engages with a mating thread (e.g., one of threads 360 of closure 350) first, and thread 340 engages with a mating thread (e.g., the other of threads 360 of closure 350) second.

Further, the steeper angle of leading portion 342 as its mating thread is moved against it will more quickly (relative to rate of rotation) draw its mating component (e.g., closure 350) into alignment with opening 312 to help inhibit cross-threading due to misalignment. In some embodiments, first thread 330 of opening 312 is configured differently from second thread 340. For example, first thread 330 may not have a change in helix angle (e.g., first thread 330 may have a constant helix angle throughout its length), and its helix angle may be the same as that of trailing portion 344 of second thread 340, as shown in FIG. 3. In some embodiments, first thread 330 of opening 312 is configured the same as second thread 340 of opening 312, except that first thread 330 is located at a different position about a central thread axis 322 of threads 320 (e.g., between 190 and 230 degrees (e.g., between 200 and 220 degrees, for example 110 degrees) about thread axis 322 relative to the position of second thread 340).

Figure 7:
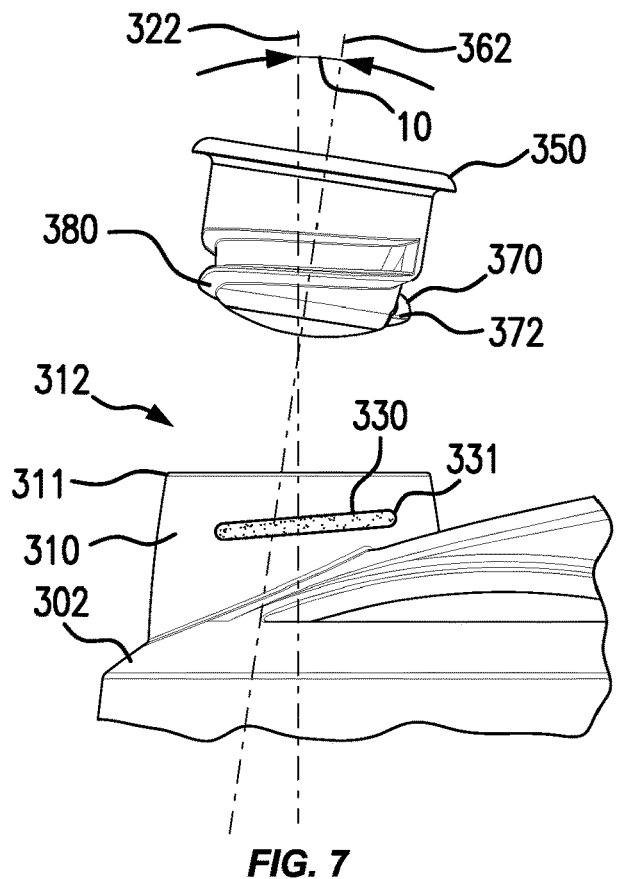
FIG. 7 shows a right-side view of a portion of the lid base of the container of FIG. 1, with a portion of the closure of the container of FIG. 1 disposed in a first position relative to the lid base during a closing operation.
Figure 8A:
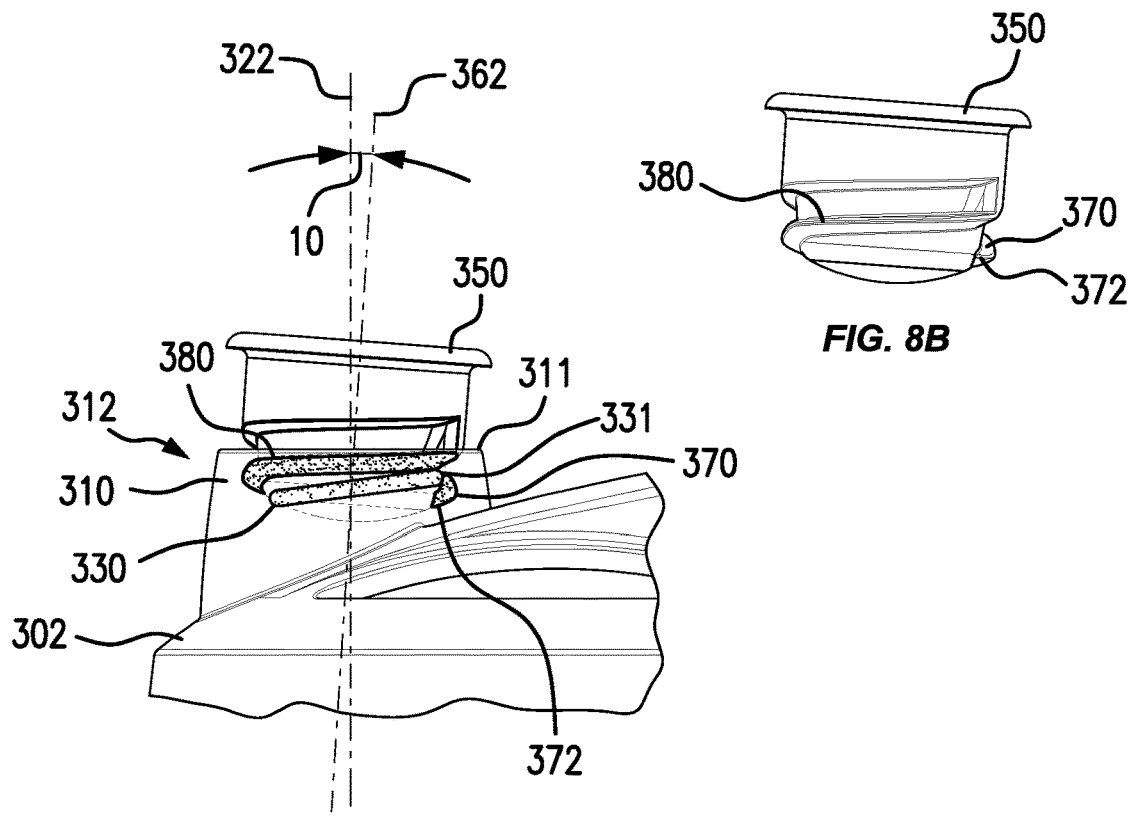
FIG. 8A shows a right-side view of a portion of the lid base of the container of FIG. 1, with a portion of the closure of the container of FIG. 1 disposed in a second position relative to the lid base during a closing operation.

FIGS. 7, 8A, 9A, and 10A show right-side views of a portion of lid base 302 (viewed from the direction of arrow 7 in FIG. 2A). FIGS. 7, 8A, 9A, and 10A also show a portion of closure 350 disposed in various positions relative to lid base 302. In FIGS. 8A, 9A, and 10A closure 350 is partially within spout 310 of lid base 302. To aid in explanation, the portions of closure 350 within spout 310 are shown through spout 310.

Figure 8B:
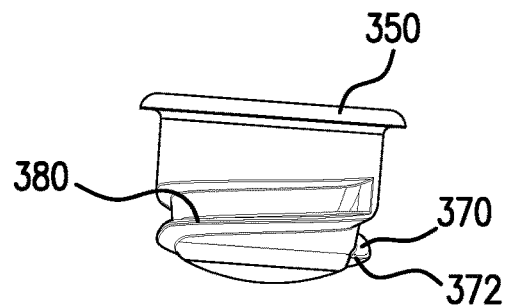
FIG. 8B shows the closure of FIG. 8A without schematic overlays.

For clarity, in FIGS. 8A, 9A, and 10A, schematic representations of the threads discussed are overlaid on the representations of lid base 302 and closure 350 to help demonstrate their relative positions. Specifically, thread 330 (internal to spout 10) of lid base 302 is shown schematically, as are threads 370 and 380 of closure 350. For further clarity, FIGS. 8B, 9B, and 10B are provided, which show corresponding positions of closure 350 without the schematic overlays. FIGS. 11-14B show corresponding views, but taken from the opposing side. Specifically FIGS. 11, 12A, 13A, and 14A show left-side views of a portion of lid base 302 (viewed from the direction of arrow 11 in FIG. 2A). FIGS. 11, 12A, 13A, and 14A also show a portion of closure 350 disposed in various positions relative to lid base 302. In FIGS. 12A, 13A, and 14A closure 350 is partially within spout 310 of lid base 302. To aid in explanation, the portions of closure 350 within spout 310 are shown through spout 310.

For clarity, in FIGS. 12A, 13A, and 14A, schematic representations of the threads discussed are overlaid on the representations of lid base 302 and closure 350 to help demonstrate their relative positions. Specifically, thread 340 (internal to spout 10) of lid base 302 is shown schematically, as are threads 370 and 380 of closure 350. For further clarity, FIGS. 12B, 13B, and 14B are provided, which show corresponding positions of closure 350 without the schematic overlays.

FIGS. 7-14B represent an example closing operation, whereby closure 350 is lowered into opening 312 and rotated in an engagement direction (e.g., clockwise) such that movable threads 360 of closure 350 engage with stationary threads 320 of opening 312 to close opening 312. For clarity, outer grip portion 352 of closure 350 is not shown. As shown in FIGS. 7 and 11, a user may not perfectly align axis 362 of threads 360 with axis 322 of threads 320, resulting in a misalignment angle 10. In some cases, such misalignment angle 10 may be the result of a structural connection between threads 360 of closure 350 and threads 320 of opening 312. With reference to FIGS. 1 and 6, for example, closure 350 may be attached to lid base 302 via a closure arm 306. Closure arm 306 may be attached to lid base 302 at pivot axis 308. Closure arm 306 may be sufficiently rigid such that it does not appreciably bend or flex in normal use. Thus, as can be understood from FIGS. 1 and 6, when closure assembly 304 rotates about pivot axis 306, axis 362 of closure threads 360 will not be aligned with axis 322 of opening threads 320. Instead, the rear side of closure threads 360 (the side closest pivot axis 308) will be disposed farther downward toward opening threads 320, thereby tending toward engaging initially with opening threads 320 at that rear side. As mentioned above, opening threads 320 may be offset to help further promote initial engagement at this position.

As a user lowers closure 350 toward opening 312 (e.g., going from FIG. 7 to FIG. 8A or from FIG. 11 to FIG. 12A) and rotates closure 350 in an engagement direction relative to opening 312, leading portion 372 of first thread 370 of closure 350 engages with leading end 331 of first thread 330 of opening 312, as seen in FIG. 8A. Because leading portion 372 of first thread 370 has a lesser helix angle than trailing portion 374 of first thread 370, such rotation quickly draws closure 350 within opening 312. And because first thread 330 and second thread 340 of opening 312 are offset, at this point second thread 380 of closure 350 has not yet engaged with second thread 340 of opening 312, leaving second thread 380 free to move downward within opening 312 unimpeded yet by thread engagement, as shown in FIG. 12A.

As closure 350 is further rotated relative to opening 312, trailing portion 374 of first thread 370 of closure 350 begins to engage leading end 331 of first thread 330 of opening 312, as shown in FIG. 9A. By this time, leading portion 382 has been rotated and lowered enough (due to engagement of first threads 330 and 370) to come into engagement with leading portion 342 of second thread 340 of opening 312, as shown in FIG. 13A. Cross-threading has been prevented, since each thread is engaged with its proper corresponding thread. Further rotation of closure 350 relative to opening 312 results in engagement of trailing portion 374 of first thread 370 of closure 350 with first thread 330 of opening 312 and in engagement of trailing portion 384 of second thread 380 of closure 350 with trailing portion 344 of second thread 340 of opening 312. In some embodiments, helix angles of trailing portion 374, trailing portion 384, trailing portion 344, and thread 330 are all the same, and are greater than helix angles of leading portion 372, leading portion 382, and leading portion 342. Such greater helix angle provides greater mechanical advantage during further thread engagement than would be the case if the lesser helix angles of leading portion 372, leading portion 382, and leading portion 342 had continued. In some embodiments helix angles of leading portion 372, leading portion 382, and leading portion 342 are all the same.

Referring back to FIG. 6, in some embodiments closure 350 includes a wall 390 spaced above one or both of threads 360. Threads 360 may extend downward helically from wall 390, and wall 390 may also be formed helically. Wall 390 may face generally toward threads 360 (e.g., downward). Wall 390 may transition from a first helix angle to a second helix angle at a transition 396. Transition 396 may be disposed above leading portion 372 or 382 of thread 370 or 380, respectively and circumferentially offset from the respective transition 376 or 386. For example, as shown in FIG. 6, transition 396 of wall 390 is disposed above (in the direction of axis 362) leading portion 382 of thread 380, and circumferentially offset (about axis 362) from transition 386 of thread 380. This structure helps allow additional space above leading portions 372, 382 to accommodate mating threads having leading portions with decreased helix angles (e.g., thread 330 of opening 312).

Figure 15:
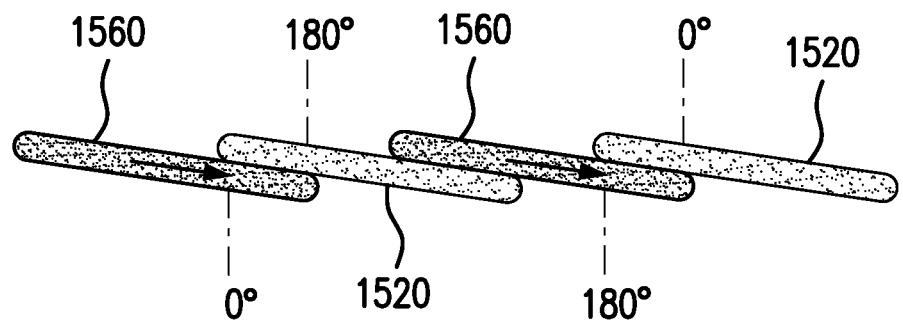
FIG. 15 is a schematic representation of a double-start thread arrangement in non-cross-threaded engagement.
Figure 16:
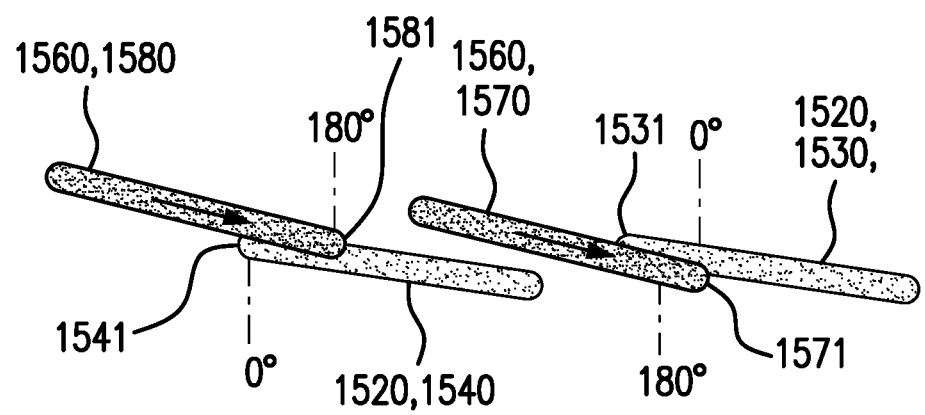
FIG. 16 is a schematic representation of a cross-threaded double-start thread arrangement.

FIGS. 15-21C are schematic representations of thread configurations representing sequences of thread engagement. FIG. 15 shows an example typical thread engagement. FIG. 16 shows an example of cross-threading. FIGS. 17A-17C show a thread configuration corresponding to the example discussed above with reference to FIGS. 1-14B. FIGS. 18A-21C show alternative configurations that could be implemented in a similar matter as described above with reference to FIGS. 1-14B. Thus some details of the thread configurations of FIGS. 17A-21C are not discussed below, and can instead be derived from the above description and explanation (e.g., made with reference to FIGS. 1-14B), which features may also apply to FIGS. 17A-21C.

In FIGS. 15-21C, for clarity threads are shown "unwrapped." That is to say, though it is understood that the threads represented by FIGS. 15-21C are helical and exist in cylindrical arrangements, they are shown as though their respective cylinders had been cut vertically and then unrolled. To help maintain consistent reference to their cylindrical configuration, as well as their rotational movement relative to each other, each set of threads has been designated with an indication of 0 degrees and 180 degrees, which positions represent opposing sides of the threads in their cylindrical form. Further, movable threads in FIGS. 15-21C are designated with arrows to show their direction of movement when rotated in their engagement direction relative to stationary threads, which have no arrows.

FIG. 15 represents an example of typical thread engagement. Movable threads 1560 rotate in the engagement direction and engage between stationary threads 1520. Movable threads 1560 and stationary threads 1520 all have the same helix angle, and none has more than one helix angle. Movable threads 1560 are equally distributed about their axis, and stationary threads 1520 are also each equally distributed about their axis. Threads herein may be referred to as "stationary" or "movable" for convenience and clarity of explanation to more clearly discuss one or more threads moving relative to one or more other threads. These references are not limiting, but are simply used to help describe relative motion between threads.

FIG. 16 represents the thread arrangement of FIG. 15, but in a cross-threaded condition. In this case, leading end 1571 of first movable thread 1570 went under leading end 1531 of first stationary thread 1530, as happened in FIG. 15, but leading end 1581 of second movable thread 1580 did not go under leading end 1541 of second stationary thread 1540. Instead leading end 1581 of second movable thread 1580 went over leading end 1541 of second stationary thread 1540. This misalignment of threads can inhibit full thread engagement and may damage the threads.

Figure 17A:
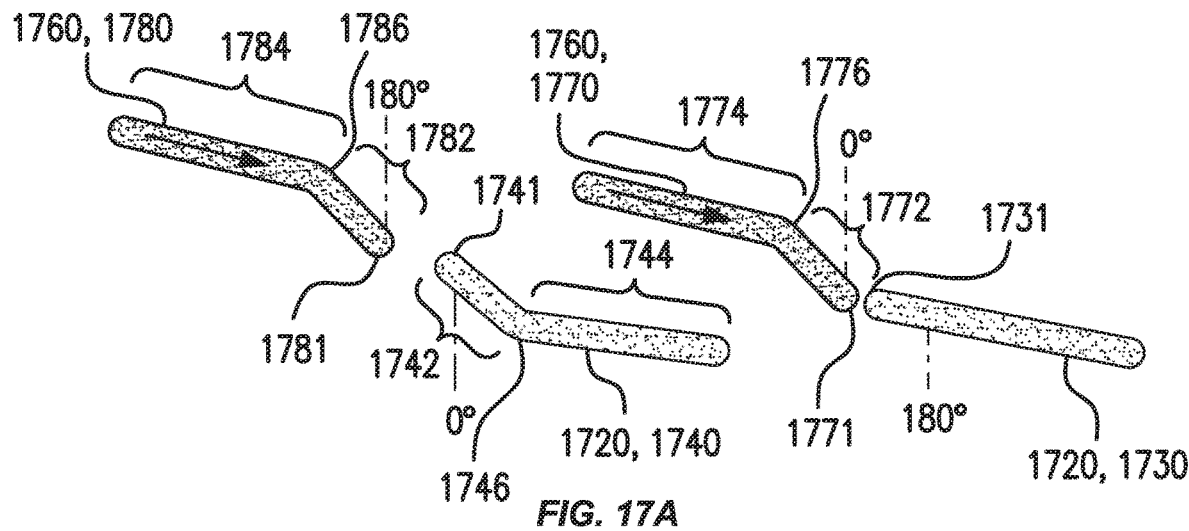
FIGS. 17A-17C sequentially show a schematic representation of thread engagement for a double-start thread arrangement.
Figure 17B:
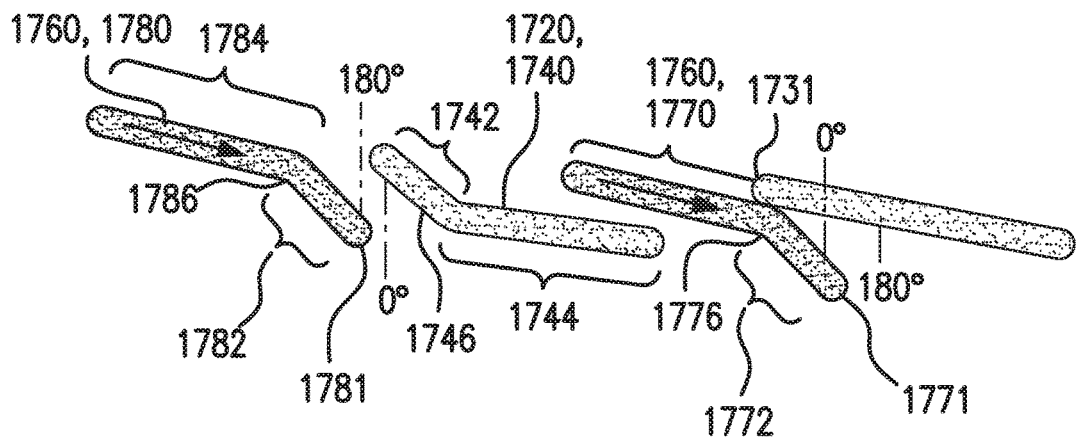
Figure 17C:
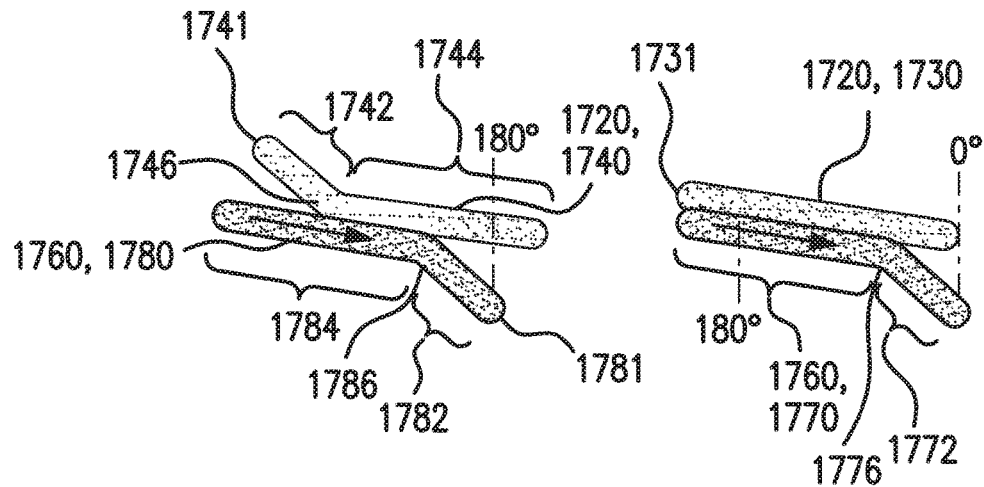

FIGS. 17A-17C show a thread configuration corresponding to the example discussed above with reference to FIGS. 1-14B. Movable threads 1760 are shown rotating in the engagement direction and engaging relative to stationary threads 1720. First movable thread 1770 includes a leading portion 1772 and a trailing portion 1774, joined at a transition 1776. Leading portion 1772 and trailing portion 1774 may be directly connected (e.g., at transition 1776). Leading portion 1772 has a lesser helix angle than trailing portion 1774, and consequently leading portion 1772 has a greater lead angle than trailing portion 1774 (e.g., a lead angle of leading portion 1772 is at least twice as great as a lead angle of trailing portion 1774). Second movable thread 1780 is configured similarly to first movable thread 1770. Specifically, second movable thread 1780 includes a leading portion 1782 and a trailing portion 1784, joined at a transition 1786. Leading portion 1782 and trailing portion 1784 may be directly connected (e.g., at transition 1786). Leading portion 1782 has a lesser helix angle than trailing portion 1784, and consequently leading portion 1782 has a greater lead angle than trailing portion 1784 (e.g., a lead angle of leading portion 1782 is at least twice as great as a lead angle of trailing portion 1784). First movable thread 1770 may be fixed relative to second movable thread 1780 (e.g., as part of a closure, such as closure 350). First movable thread 1770 and second movable thread 1780 may be evenly distributed about an axis of threads 1760 (e.g., a leading end 1771 of first movable thread 1770 may be disposed 180 degrees from a leading end 1781 of second movable thread 1780 about the axis of threads 1760).

First stationary thread 1730 includes a single helix angle throughout its length. Second stationary thread 1740 includes a leading portion 1742 and a trailing portion 1744, joined at a transition 1746. Leading portion 1742 and trailing portion 1744 may be directly connected (e.g., at transition 1746). Leading portion 1742 has a lesser helix angle than trailing portion 1744, and consequently leading portion 1742 has a greater lead angle than trailing portion 1744 (e.g., a lead angle of leading portion 1742 is at least twice as great as a lead angle of trailing portion 1744). First stationary thread 1730 may be fixed relative to second stationary thread 1740 (e.g., as part of an opening, such as opening 312). First stationary thread 1730 and second stationary thread 1740 may be offset (e.g., unevenly distributed about an axis of threads 1760 such that a leading end 1731 of first stationary thread 1730 may be disposed more than 180 degrees from a leading end 1741 of second stationary thread 1740 about the axis of threads 1760).

As shown in FIG. 17A, upon rotation of movable threads 1760 relative to stationary threads 1720, leading end 1771 of first movable thread 1770 will meet and engage with (i.e., travel below) leading end of 1731 of first stationary thread 1720. Due to the offset of stationary threads 1720, at the time that leading end 1771 of first movable thread 1770 meets and engages with leading end of 1731 of first stationary thread 1720, leading end 1781 of second movable thread 1780 is spaced apart from and not yet engaged with leading end 1741 of second stationary thread 1740. This allows additional rotational travel for leading end 1781 of second movable thread 1780 to be brought below leading end 1741 of second stationary thread 1740, such that further rotation will result in proper alignment of second movable thread 1780 with second stationary thread 1740 to avoid cross-threading.

As shown in FIG. 17B, upon continuing rotation of movable threads 1760 relative to stationary threads 1720, first movable thread 1770 is drawn rapidly below leading end 1731 of first stationary thread, due to the lesser helix angle of leading portion 1772 of first movable thread 1770. During this movement, second movable thread 1780 is correspondingly drawn down farther such that leading end 1781 of second movable thread 1780 is positioned well below leading end 1741 of second stationary thread 1740 so as to eliminate risk of misalignment (e.g., cross-threading). Then trailing portion 1774 of first movable thread 1770 begins engagement with first stationary thread 1730. Continued rotation of movable threads 1760 relative to stationary threads 1720 causes trailing portion 1784 of second movable thread 1780 to come into engagement with trailing portion 1744 of second stationary thread 1740. Helix angles of trailing portion 1774 of first movable thread 1770 and of first stationary thread 1730 are greater than that of leading portion 1772 of first movable thread, as are helix angles of trailing portion 1784 of second movable thread 1780 and of trailing portion 1744 of second stationary thread 1740. A greater helix angle can provide greater mechanical advantage (e.g., for the application of force in the axial direction). Thus, this configuration can take advantage of the mechanical advantage of the greater helix angles of trailing portion 1774, trailing portion 1784, trailing portion 1744, and first stationary thread 1730, while also getting the alignment benefits of the lesser helix angles of leading portion 1772, leading portion 1782, and leading portion 1742.

Movable threads 1760 and stationary threads 1720 may be applied to various types of components to be coupled together including, for example, a spout and closure of a beverage container, such as spout 310 (and opening 312) and closure 350 of beverage container 100 described above. Movable threads 1760 may be external threads and stationary threads 1720 may be internal threads (e.g., as shown in the examples of FIGS. 1-14B), or in some embodiments movable threads 1760 may be internal threads and stationary threads 1720 may be external threads.

As described herein, alignment between threads can be improved by (1) offset stationary threads, (2) a lesser helix angle in a leading portion of a movable thread than in a trailing portion of the movable thread, and (3) a lesser helix angle in a leading portion of a stationary thread than in a trailing portion of the stationary thread. Any one of these features can effect an improvement in alignment, independent of the others. Further, any two of these features could be used in combination to achieve improved alignment. Or all three may be used together to achieve even further improved alignment, as has been described.

In some embodiments, first stationary thread 1730 may have a leading portion and a trailing portion, with its leading portion having a helix angle lesser than its trailing portion.

Figure 18A:
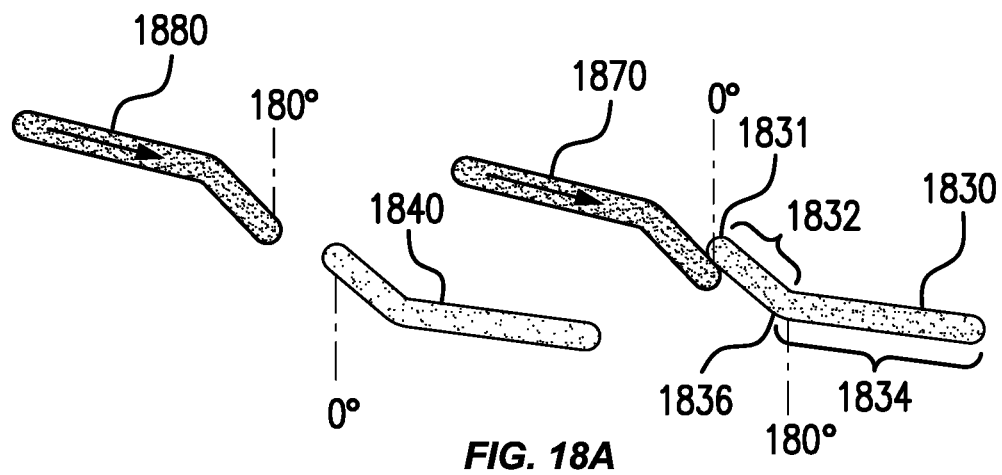
FIGS. 18A-18C sequentially show a schematic representation of thread engagement for a double-start thread arrangement.
Figure 18B:
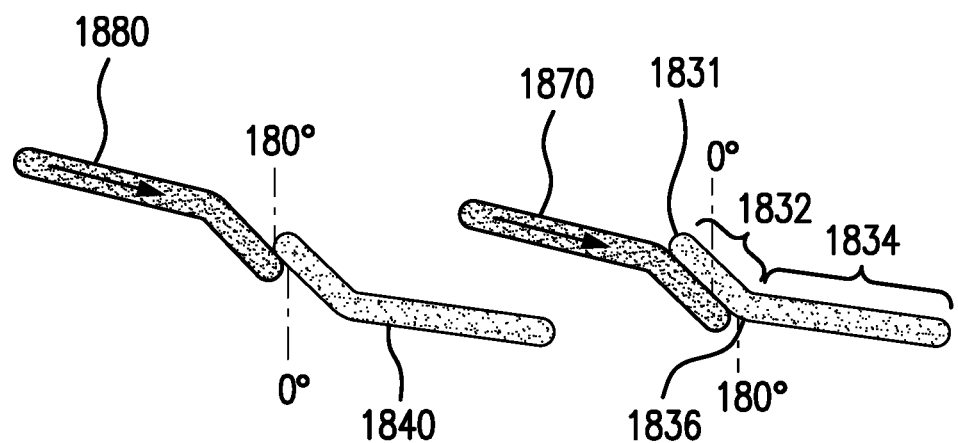
Figure 18C:
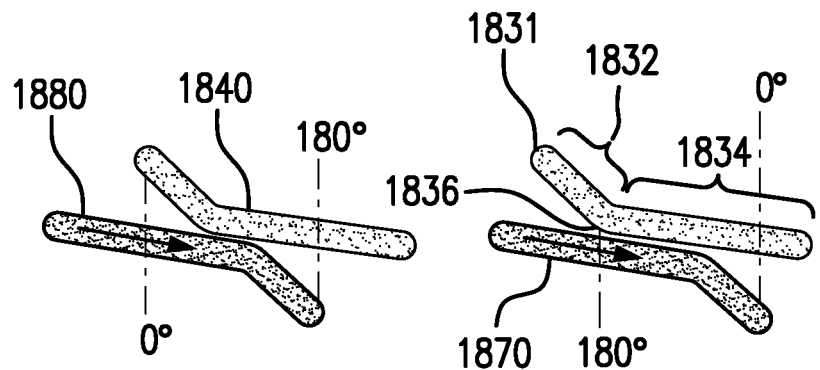

In such embodiments first stationary thread 1730 may be configured with the shape of second stationary thread 1740. An example of this is represented in FIGS. 18A-18C, which shows first movable thread 1870, second movable thread 1880, first stationary thread 1830, and second stationary thread 1840. In this example, first movable thread 1870, second movable thread 1880, and second stationary thread 1840 are the same, respectively, as first movable thread 1770, second movable thread 1780, and second stationary thread 1740 discussed above with reference to FIGS. 17A-17C. In the example shown in FIGS. 18A-18C, first stationary thread 1830 has a leading portion 1832 and a trailing portion 1834, joined at a transition 1836. The helix angle of leading portion 1832 is lesser than the helix angle of trailing portion 1834. Rotation of movable threads 1870, 1880 together in the engagement direction relative to stationary threads 1830, 1840 engages the threads together as depicted in the sequence shown in FIGS. 18A-18C, in a similar way as described above with reference to the sequence of FIGS. 17A-17C, with the offset position of the stationary threads and the lesser helix angles of leading portions of stationary threads 1830, 1840 and of movable threads 1870, 1880 providing room for second movable thread 1880 to drop into position below second stationary thread 1840 before their engagement.

Movable threads 1870, 1880 and stationary threads 1830, 1840 may be applied to various types of components to be coupled together including, for example, a spout and closure of a beverage container, such as spout 310 (and opening 312) and closure 350 of beverage container 100 described above. Movable threads 1870, 1880 may be external threads and stationary threads 1830, 1840 may be internal threads (e.g., as shown in the examples of FIGS. 1-14B), or in some embodiments movable threads 1870, 1880 may be internal threads and stationary threads 1830, 1840 may be external threads.

Figure 19A:
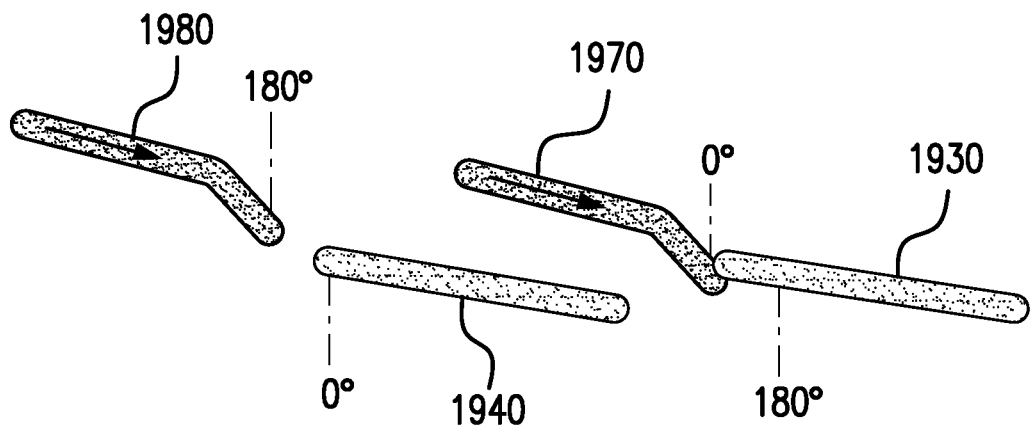
FIGS. 19A-19C sequentially show a schematic representation of thread engagement for a double-start thread arrangement.
Figure 19B:
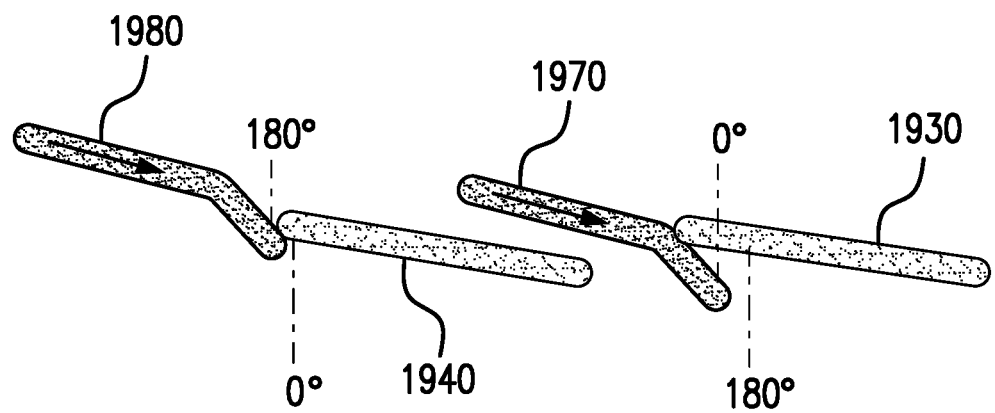
Figure 19C:
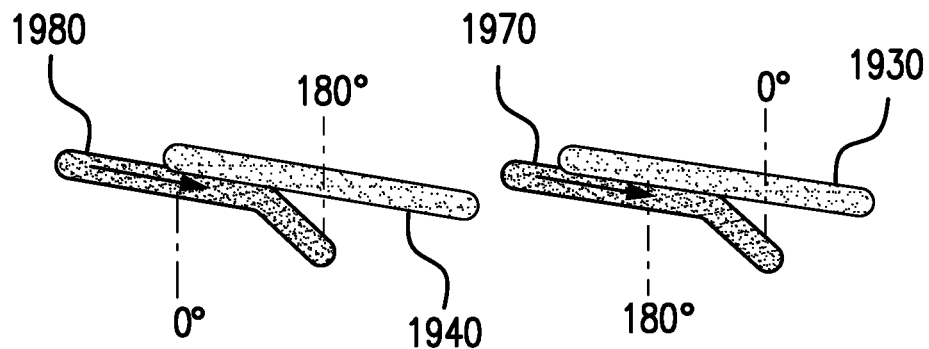

In some embodiments, both movable threads may have leading portions that have lesser helix angles than their trailing portions, and both stationary threads may have no change in helix angle. An example of this is represented in FIGS. 19A-19C, which shows first movable thread 1970, second movable thread 1980, first stationary thread 1930, and second stationary thread 1940. In this example, first moveable thread 1970, second movable thread 1980, and first stationary thread 1930 are the same, respectively, as first movable thread 1770, second movable thread 1780, and first stationary thread 1730 discussed above with reference to FIGS. 17A-17C. Second stationary thread 1940 differs from second stationary thread 1740 in that second stationary thread 1940 does not have a change in helix angle (i.e., second stationary thread 1940 has a constant helix angle). Rotation of movable threads 1970, 1980 together in the engagement direction relative to stationary threads 1930, 1940 engages the threads together as depicted in the sequence shown in FIGS. 19A-19C, in a similar way as described above with reference to the sequence of FIGS. 17A-17C, with the offset position of the stationary threads and the lesser helix angles of leading portions of movable threads 1970, 1980 providing room for second movable thread 1980 to drop into position below second stationary thread 1940 before their engagement.

Movable threads 1970, 1980 and stationary threads 1930, 1940 may be applied to various types of components to be coupled together including, for example, a spout and closure of a beverage container, such as spout 310 (and opening 312) and closure 350 of beverage container 100 described above. Movable threads 1970, 1980 may be external threads and stationary threads 1930, 1940 may be internal threads (e.g., as shown in the examples of FIGS. 1-14B), or in some embodiments movable threads 1970, 1980 may be internal threads and stationary threads 1930, 1940 may be external threads.

Figure 20A:
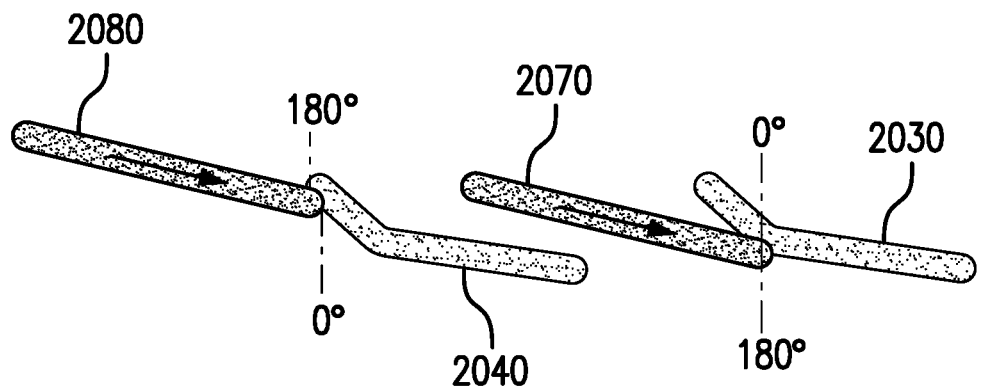
FIGS. 20A-20B sequentially show a schematic representation of thread engagement for a double-start thread arrangement.
Figure 20B:
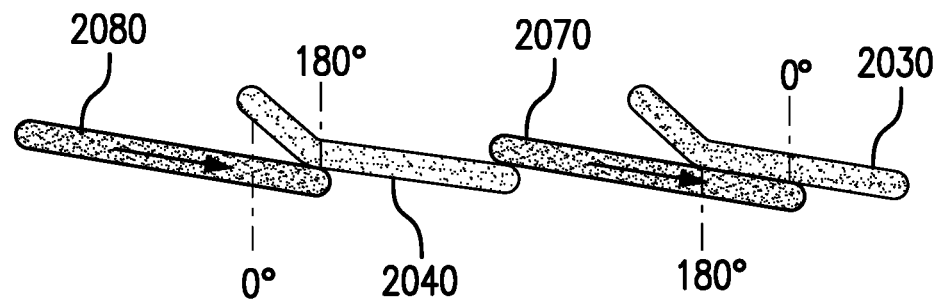

In some embodiments, both stationary threads may have leading portions that have lesser helix angles than their trailing portions, and both movable threads may have no change in helix angle. An example of this is represented in FIGS. 20A-20B, which shows first movable thread 2070, second movable thread 2080, first stationary thread 2030, and second stationary thread 2040. In this example, first stationary thread 2030 and second stationary thread 2040 are the same, respectively, as first stationary thread 1830 and second stationary thread 1840 discussed above with reference to FIGS. 18A-18C. First movable thread 2070 and second movable thread 2080 differ from first movable thread 1870 and second movable thread 1880 in that first movable thread 2070 and second movable thread 2080 each does not have a change in helix angle (i.e., each of first movable thread 2070 and second movable thread 2080 has a constant helix angle). Rotation of movable threads 2070, 2080 together in the engagement direction relative to stationary threads 2030, 2040 engages the threads together as depicted in the sequence shown in FIGS. 20A-20B, in a similar way as described above with reference to the sequence of FIGS. 17A-17C, with the offset position of the stationary threads and the lesser helix angles of leading portions of stationary threads 2030, 2040 providing room for second movable thread 2080 to drop into position below second stationary thread 2040 before their engagement.

Movable threads 2070, 2080 and stationary threads 2030, 2040 may be applied to various types of components to be coupled together including, for example, a spout and closure of a beverage container, such as spout 310 (and opening 312) and closure 350 of beverage container 100 described above. Movable threads 2070, 2080 may be external threads and stationary threads 2030, 2040 may be internal threads (e.g., as shown in the examples of FIGS. 1-14B), or in some embodiments movable threads 2070, 2080 may be internal threads and stationary threads 2030, 2040 may be external threads.

Figure 21A:
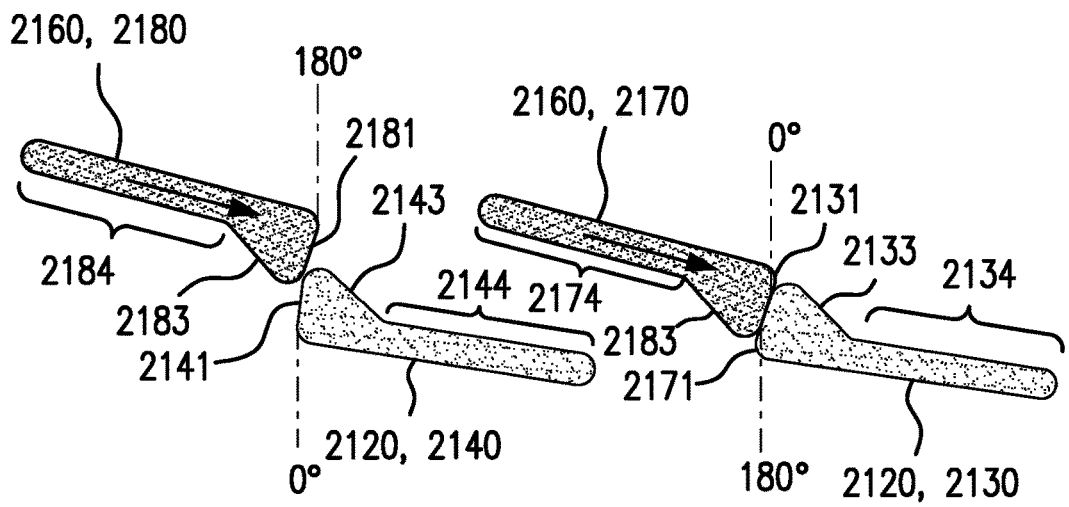
FIGS. 21A-21C sequentially show a schematic representation of thread engagement for a double-start thread arrangement.
Figure 21B:
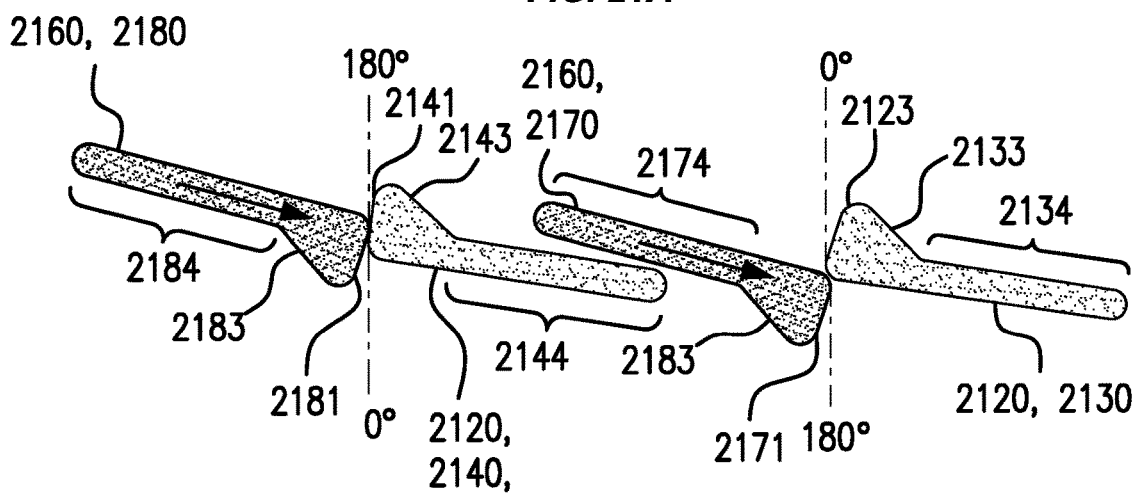
Figure 21C:
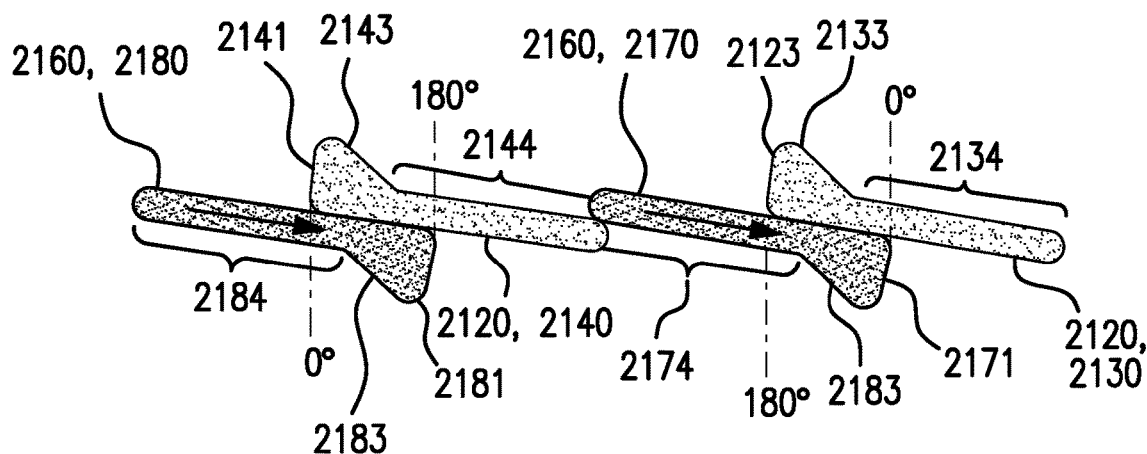

In some embodiments threads may have blunted leading ends. This may be characterized as having a helix angle of zero or having no helix angle at the blunted ends. For example, as represented in FIGS. 21A-21C, stationary threads 2120 include first stationary thread 2130 and second stationary thread 2140, each having a blunted leading end (blunted leading end 2131 and blunted leading end 2141, respectively). For example, blunted leading ends 2131, 2141 may each form a flat end surface. In some embodiments such flat end surface may be taller than a thickness of a trailing portion of its thread (e.g., trailing portion 2134 of first stationary thread 2130 or trailing portion 2144 of second stationary thread 2140), both height and thickness of a respective thread being measured in a direction of a helical axis of the thread. For example, a blunted leading end may have a flat end surface that is taller than a thickness of a trailing portion of its thread at a transition between its leading and trailing portions, taller than a thickness of a trailing portion of its thread at any point at which its trailing end has a thickness, or taller than an average thickness of the trailing portion of its thread.

Correspondingly, movable threads 2160 include first movable thread 2170 and second movable thread 2180, each having a blunted leading end (blunted leading end 2171 and blunted leading end 2181). As with blunted leading ends 2131, 2141, blunted leading ends 2171 and 2181 may each form a flat end surface. In some embodiments such flat end surface may be taller than a thickness of a trailing portion of its thread (e.g., trailing portion 2174 of first stationary thread 2170 or trailing portion 2184 of second stationary thread 2180), both height and thickness of a respective thread being measured in a direction of a helical axis of the thread. For example, a blunted leading end may have a flat end surface that is taller than a thickness of a trailing portion of its thread at a transition between its leading and trailing portions, taller than a thickness of a trailing portion of its thread at any point at which its trailing end has a thickness, or taller than an average thickness of the trailing portion of its thread.

As movable threads 2160 rotate in the engagement direction relative to stationary threads 2120, blunted leading ends 2171 and 2181 of movable threads 2160 make contact with blunted leading ends 2131 and 2141 of stationary threads 2120. In the example shown in FIGS. 21A-21C blunted leading ends 2171 and 2181 of movable threads 2160 are evenly distributed about the axis of movable threads 2160 (i.e., they are spaced 180 degrees apart from each other about the axis of movable threads 2160), and blunted leading ends 2131 and 2141 of stationary threads are evenly distributed about the axis of stationary threads 2120 (i.e., they are spaced 180 degrees apart from each other about the axis of movable threads 2120). The even distribution of both movable threads 2160 and stationary threads 2120 provide simultaneous engagement of first movable thread 2170 with first stationary thread 2130 and of second movable thread 2180 with second stationary thread 2140, as shown in FIGS. 21A and 21B. And the relative height and flat surfaces of blunted leading ends 2131, 2141, 2171, 2181 inhibit blunted leading end 2171 from moving past and below blunted leading end 2131 until blunted leading end 2181 is able to move past and below blunted leading end 2141, and vice versa. This is shown in the sequence of FIGS. 21A-21C, in which both first movable thread 2170 and second movable thread 2180 move downward relative to first stationary thread 2130 and second stationary thread 2140 but neither can advance rotationally until both blunted leading end 2171 of first movable thread 2170 is below blunted leading end 2131 of first stationary thread 2130 and blunted leading end 2181 of second movable thread 2180 is below blunted leading end 2141 of second stationary thread 2140, as shown in FIG. 21C.

In some embodiments, a height of blunted leading end 2171 (i.e., the distance that blunted leading end 2171 extends in the direction of the axis of movable threads 2160) is the same as a height of blunted leading end 2181. In some embodiments, a height of blunted leading end 2131 (i.e., the distance that blunted leading end 2131 extends in the direction of the axis of stationary threads 2120) is the same as a height of blunted leading end 2141. In some embodiments, heights of all of blunted leading ends 2131, 2141, 2151, and 2161 are the same.

In some embodiments, threads 2130, 2140, 2170, and 2180 have a transition portion (transition portions 2133, 2143, 2173, and 2183 respectively) extending between their respective blunted leading ends 2131, 2141, 2171, and 2181 and their respective trailing portions 2134, 2144, 2174, and 2184. Transition portions 2133, 2143, 2173, and 2183 may form a slope between blunted leading ends 2131, 2141, 2171, and 2181 and trailing portions 2134, 2144, 2174, and 2184, to help prevent threads from catching on each other when rotated in a disengagement direction (e.g., commonly counterclockwise).

As shown in FIGS. 21A-21C, movable threads 2160 and stationary threads 2120 have blunted leading ends. In some embodiments, however, only movable threads 2160 have blunted leading ends. In such embodiments, stationary threads 2120 may be straight threads (e.g., helical threads without a blunted end or change in helix angle, like stationary threads 1930 and 1940 in FIGS. 19A-19C). And in some embodiments, only stationary threads 2120 have blunted leading ends. In such embodiments, movable threads 2160 may be straight threads (e.g., helical threads without a blunted end or change in helix angle, like threads 2070 and 2080 in FIGS. 20A and 20B). In still further embodiments, only one of threads 2130, 2140, 2170, and 2180 may have a blunted leading end.

Movable threads 2160 and stationary threads 2120 may be applied to various types of components to be coupled together including, for example, a spout and closure of a beverage container, such as spout 310 (and opening 312) and closure 350 of beverage container 100 described above. Movable threads 2160 may be external threads and stationary threads 2120 may be internal threads (e.g., as shown in the examples of FIGS. 1-14B), or in some embodiments movable threads 2160 may be internal threads and stationary threads 2120 may be external threads.

Any of the threads described herein may have any of various threadforms. For example, the cross-sectional shape of threads described herein may be trapezoidal, triangular, or square, and such shapes may have radiused corners.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A container comprising:
   an opening;
   a first helical thread, the first helical thread disposed about at least a portion of the opening;
   a closure configured to close the opening; and
   a second helical thread, the second helical thread formed on the closure,
   wherein the second helical thread has a helical leading portion having a first helix angle and a helical trailing portion having a second helix angle, and wherein the first helix angle is lesser than the second helix angle.

2. The container of claim 1, wherein at least a portion of the first helical thread has the same helix angle as the trailing portion of the second helical thread.

3. The container of claim 1, further comprising a third helical thread, the third helical thread surrounding at least a portion of the opening,
wherein the first helical thread and the third helical thread are fixed in position relative to the opening, and
wherein the container comprises no threads surrounding at least a portion of the opening and fixed relative to the opening other than the first helical thread and the third helical thread.

4. The container of claim 3, wherein the third helical thread has a leading portion having a first helix angle and a trailing portion having a second helix angle, wherein the first helix angle of the third helical thread is lesser than the second helix angle of the third helical thread.

5. The container of claim 4, wherein the first helix angle of the third helical thread is the same as the first helix angle of the second helical thread, and
wherein the second helix angle of the first helical thread is the same as the second helix angle of the second helical thread.

6. The container of claim 4, wherein the length of the leading portion of the third helical thread is the same as the length of the leading portion of the second helical thread.

7. The container of claim 4, wherein the third helical thread is continuous, and
wherein the leading portion of the third helical thread is directly connected to the trailing portion of the third helical thread.

8. The container of claim 4, wherein the leading portion of the second helical thread has a lead angle that is at least twice as great as a lead angle of the trailing portion of the second helical thread, or
wherein the leading portion of the third helical thread has a lead angle that is at least twice as great as a lead angle of the trailing portion the third helical thread.

9. The container of claim 1, further comprising a third helical thread, the third helical thread surrounding at least a portion of the opening and having a shared thread axis with the first helical thread,
wherein a leading end of the first helical thread is spaced between 190 degrees and 230 degrees about the shared thread axis from a leading end of the third helical thread.

10. The container of claim 1, wherein the second helical thread is continuous, and
wherein the leading portion of the second helical thread is directly connected to the trailing portion of the second helical thread.

11. The container of claim 1, wherein the helical threads have smooth upper and lower surfaces throughout their respective lengths.

12. The container of claim 1, wherein the first helical thread is disposed within the opening.

13. The container of claim 1, further comprising a helical wall formed on the closure, the helical wall disposed above and facing toward the second helical thread, wherein the helical wall transitions from a first helix angle to a second helix angle above the leading portion of the second helical thread, and
wherein the transition from the first helix angle of the helical wall to the second helix angle of the helical wall is disposed circumferentially offset from a transition from the first helix angle of the second helical thread to the second helix angle of the second helical thread.

14. The container of claim 13, wherein the first helix angle of the helical wall is the same as the first helix angle of the second helical thread, and wherein the second helix angle of the helical wall is the same as the second helix angle of the second helical thread.

15. The container of claim 1, wherein the leading portion and the trailing portion are directly connected.

16. The container of claim 1, wherein the leading portion and the trailing portion are joined by a transition forming a bend in the second helical thread.

17. The container of claim 1, wherein the leading portion and the trailing portion make up the entire second helical thread.

18. The container of claim 1, wherein the second helical thread is configured to engage with the first helical thread.

19. The container of claim 1, wherein the first helical thread has a constant helix angle throughout the length of the first helical thread.

20. The container of claim 1, wherein the leading portion of the second helical thread increases in thickness toward a leading end of the leading portion of the second helical thread, and
wherein the leading end of the leading portion of the second helical thread forms a flat end surface taller than a thickness of the trailing portion of the second helical thread.

* * * * *

UNITED STATES PATENT AND TRADEMARK OFFICE
CERTIFICATE OF CORRECTION

| | | |
|---|---|---|
| PATENT NO. | : 12,420,989 B2 | Page 1 of 1 |
| APPLICATION NO. | : 16/997592 | |
| DATED | : September 23, 2025 | |
| INVENTOR(S) | : David Bytheway | |

It is certified that error appears in the above-identified patent and that said Letters Patent is hereby corrected as shown below:

In the Claims

In Column 17, Claim 8, Line 40, delete "portion the third" and insert --portion of the third--, therefor.

Signed and Sealed this
Sixth Day of January, 2026

John A. Squires
*Director of the United States Patent and Trademark Office*